(12) United States Patent
Sakamoto et al.

(10) Patent No.: US 7,984,271 B2
(45) Date of Patent: Jul. 19, 2011

(54) PROCESSOR DEVICE FOR OUT-OF-ORDER PROCESSING HAVING RESERVATION STATIONS UTILIZING MULTIPLEXED ARITHMETIC PIPELINES

(75) Inventors: Mariko Sakamoto, Kawasaki (JP); Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/875,431

(22) Filed: Oct. 19, 2007

(65) Prior Publication Data
US 2008/0040589 A1 Feb. 14, 2008

Related U.S. Application Data

(63) Continuation of application No. PCT/JP2005/007591, filed on Apr. 21, 2005.

(51) Int. Cl.
*G06F 9/30* (2006.01)
(52) U.S. Cl. .......................... 712/217; 712/229
(58) Field of Classification Search .................. 712/217, 712/229
See application file for complete search history.

(56) References Cited

U.S. PATENT DOCUMENTS

| | | | | |
|---|---|---|---|---|
| 5,471,593 A | * | 11/1995 | Branigin ....................... | 712/235 |
| 5,592,679 A | * | 1/1997 | Yung ............................ | 712/23 |
| 5,649,138 A | * | 7/1997 | Ireton .......................... | 712/217 |
| 5,870,578 A | * | 2/1999 | Mahalingaiah et al. ....... | 712/215 |
| 6,192,465 B1 | * | 2/2001 | Roberts ........................ | 712/212 |
| 6,412,063 B1 | * | 6/2002 | Samra .......................... | 712/210 |
| 6,519,683 B2 | * | 2/2003 | Samra et al. .................. | 711/125 |
| 6,581,155 B1 | * | 6/2003 | Lohman et al. ................ | 712/222 |
| 6,742,111 B2 | * | 5/2004 | Soni .............................. | 712/217 |
| 6,938,150 B2 | | 8/2005 | Fukagawa | |
| 6,944,750 B1 | * | 9/2005 | Sheaffer ........................ | 712/215 |
| 2002/0019927 A1 | | 2/2002 | Hondou | |
| 2003/0014613 A1 | * | 1/2003 | Soni ............................. | 712/217 |
| 2004/0006682 A1 | * | 1/2004 | Yoshida ........................ | 712/215 |
| 2004/0006686 A1 | * | 1/2004 | Yoshida ........................ | 712/218 |

FOREIGN PATENT DOCUMENTS

| | | |
|---|---|---|
| JP | 7-182160 | 7/1995 |
| JP | 11-143711 | 5/1999 |
| JP | 2000-181707 | 6/2000 |

OTHER PUBLICATIONS

David A. Patterson, et al., "Another Dynamic Scheduling Approach—The Tomasulo Algorithm", *Computer Architecture—A Quantative Approach*, pp. 299-308, published by Morgan Kaufmann Publishers, Inc., San Mateo, California.

English language version of the International Search Report mailed Jun. 7, 2005 in connection with the International Application No. PCT/JP2005/007591.

* cited by examiner

*Primary Examiner* — Idriss N Alrobaye
(74) *Attorney, Agent, or Firm* — Staas & Halsey LLP

(57) ABSTRACT

A processor device having a reservation station (RS) is concerned. In case the processor device has plural RS, the RS is associated with an arithmetic pipeline, and two RS make a pair. When one RS of the pair cannot dispatch an instruction to an associated arithmetic pipeline, the other RS dispatches the instruction to that arithmetic pipeline, or delivers its held instruction to the one RS. In case one RS is equipped, plural entries in the RS are divided into groups, and by dynamically changing this grouping according to the dispatch frequency of the instruction to the arithmetic pipelines or the held state of the instructions, the arithmetic pipelines are efficiently utilized. Incidentally, depending on the grouping of the plural entries in the RS, a configuration as if the plural RS were allocated to each arithmetic pipeline may be realized.

3 Claims, 15 Drawing Sheets

| RS0 | RS1 | RS2 | MODE |
|---|---|---|---|
| ○ | ○ | ○ | G |
| ○ | ○ | × | G |
| ○ | × | × | R |
| × | × | × | Y |
| × | × | ○ | R |
| △ | — | — | G |
| OTHERS ||| B |
| ○ | × | ○ | B |
| × | ○ | × | B |
| × | ○ | ○ | B |

FIG.12

PROCESSOR DEVICE FOR OUT-OF-ORDER PROCESSING HAVING RESERVATION STATIONS UTILIZING MULTIPLEXED ARITHMETIC PIPELINES

CROSS-REFERENCE TO RELATED APPLICATIONS

This application is a continuing application, filed under 35 U.S.C. section 111(a), of International Application PCT/JP2005/007591, filed Apr. 21, 2005.

TECHNICAL FIELD OF THE INVENTION

This invention relates to an out-of-order type superscalar processor device having multiplexed arithmetic pipelines and reservation stations to temporarily hold decoded instructions.

BACKGROUND OF THE INVENTION

Recently, a method is adopted in a lot of processors, in which a buffer called a reservation station is provided between an instruction decoder and arithmetic pipelines, an instruction for which execution conditions are satisfied is selected among instructions stored temporarily in the reservation station without relation to an instruction order in the program (called an out-of-order method), and the selected instruction is issued to any one of the multiplexed arithmetic pipelines. In addition, a multi-thread processing method that is a technique to effectively utilize the arithmetic units also begins to be adopted in the processor devices in the market. However, these have following problems.

(1) A method that one reservation station is prepared and the instruction is issued from that to plural pipelines leads to the most efficient utilization of the arithmetic pipelines. However, when extending the range of choices of the instructions to be issued to the pipelines by increasing the number of entries in the reservation station in order to improve the parallelization degree, there is a problem that logic implementation to select plural instructions to be issued from a lot of entries becomes complicated. In order to cope with such complexity, there is a countermeasure in which the number of stages in the arithmetic pipeline is increased, or a countermeasure in which the improvement of the clock speed is suppressed. However, these countermeasures fall in a direction opposite to the performance improvement that is an original purpose.

(2) When the reservation station is divided, and the number of entries in one reservation station is limited to such an extent that the instruction to be issued can be selected, the problem (1) can be resolved. However, there is a problem that the range of instruction choices becomes narrow, and accordingly the improvement of the parallelization degree is limited.

(3) When adopting a configuration that the reservation station is divided, the arithmetic pipeline in which an arithmetic operation is to be executed is fixed at a stage when an instruction is output from a decoder to the reservation station, in a conventional technique. In such a case, by the relative merit of instruction output destination reservation station determination algorithms in the decoder, bubble occurrences in the arithmetic pipelines differ. Because an effective algorithm is different for each workload, the dynamic optimization is required on each occasion. Incidentally, because the logic of the decoder is originally complicated, the further increase of the complexity makes the capability low.

(4) In a processing method called the multi-thread method (a method in which plural jobs, which have no dependency each other, share the arithmetic pipeline.), there is difference of the potential instruction parallelization degree based on difference of the property between jobs. As the result, the frequency that the instruction can be issued from the reservation station to the arithmetic pipeline differs. When there are plural reservation stations and each of the reservation stations is connected with a specific arithmetic pipeline, it is especially necessary in the multi-thread method to appropriately carry out the instruction storage to the reservation station. However, the processing of the decoder in the processor device in this method is more complicated than a conventional method (i.e. a single-thread method), and it is difficult to optimize the instruction output to the reservation station, in which the property of the job is taken into consideration, without changing the number of stages in the arithmetic pipeline. Therefore, a means for optimization at the instruction output to the arithmetic pipeline is required at a side of the reservation station.

Incidentally, for example, US-2003/0014613-A1 discloses a technique to improve the parallelism in a data processing, reduce the waiting time of the instruction execution, and increase the processing speed. Specifically, a data processing system having a decentralized reservation station is provided, and the decentralized reservation station stores a basic block of codes in a microprocessor instruction form. Therefore, the basic block of the codes can be dispersed to several decentralized reservation stations. Thus, the number of entries in each decentralized reservation station is decreased, the waiting time to execute the instruction is reduced, and the processing speed is increased. In this publication, the plural reservation stations are associated with plural arithmetic units, and the algorithm to determine from which reservation station the instruction is output to which arithmetic unit becomes complicated.

In addition, JP-A-2000-181707 discloses a technique to reduce an amount of materials of an instruction processing device enabling the out-of-order instruction execution in order to execute the instruction processing in an information processing apparatus at high speed and to enable high speed operation. Specifically, in an instruction control device of the information processing apparatus, in which a storage means for temporarily storing plural instructions that have been decoded but have not been issued to any execution units is provided, the storage means is configured so that an order of each entry indicates a decoded order of the instructions stored therein, an entry from which an instruction is issued is deleted, and stored information moves between entries so as to configure entries in an order that entries including not issued instructions are consecutive. Then, a movement amount between entries is maximum and is equal to the number of instructions, which can be simultaneously decoded. In this publication, an instruction can be outputted to any execution unit from each entry in the reservation station, and there is a problem that the logic to determine to which execution unit an instruction should be outputted from each entry becomes complicated.

Moreover, U.S. Pat. No. 6,938,150 discloses a technique to efficiently utilize a reorder buffer in a processor that an out-of-order execution is carried out by using the reorder buffer and the like. Specifically, each functional unit such as an arithmetic unit, a store unit, and a load unit uses an entry number (WRB number) of the reorder buffer to notify the end of the processing of the instruction stored in that entry in its own unit to the reorder buffer. However, the load unit manages the latest speculation state of an issued load instruction based on a branch prediction success/failure signal outputted from a branch unit, and as for the load instruction followed by a branch instruction for which the branch prediction is failed, even when the processing is completed, the notification to the reorder buffer by the WRB number is not carried out. Thus, it is said that the reorder buffer can immediately use an entry storing the load instruction followed by the branch instruction for which the branch prediction is failed. This publication indicates an example in which plural functional units for one reservation station are provided. However, it is said that a different reservation station may be provided for each functional unit, and one common reservation station may be provided for each group of several functional units.

US-2002/0019927-A1 discloses an example in which each entry is associated with a specific arithmetic unit.

As described above, when the number of entries in the reservation station increases, the logic to select plural instructions, which satisfy the execution conditions, from there is complicated, and at the implementation, the trade-off with the performance improvement occurs. In addition, in order to efficiently issue the instruction from the plural reservation stations, the high-level dynamic optimization is required at a stage of storing an instruction into the reservation station. This causes the decoder whose implementation has already been complicated to be further complicated.

SUMMARY OF THE INVENTION

Therefore, an object of this invention is to provide a processor device having a new reservation station enabling to efficiently utilize multiplexed arithmetic pipelines without increasing the complexity of instruction issuance logic of the decoder and/or instruction output logic from the reservation station to the arithmetic pipeline.

A processor device according to a first aspect of this invention has a plurality of reservation stations having a plurality of entries; a plurality of arithmetic pipelines; and a controller for the plurality of reservation stations. Then, in a normal mode, a first reservation station of the plurality of reservation stations is associated with a first arithmetic pipeline of the plurality of arithmetic pipelines, and in the normal mode, a second reservation station other than the first reservation station of the plurality of reservation stations is associated with a second arithmetic pipeline other than the first arithmetic pipeline of the plurality of arithmetic pipelines. In addition, when the controller detects a specific operation mode that an instruction dispatch from the first reservation station to the first arithmetic pipeline is not carried out, the controller controls the second reservation station so as to dispatch an instruction to the first arithmetic pipeline in addition to the second arithmetic pipeline.

Thus, in the specific operation mode that an instruction is not dispatched from the first reservation station to the first arithmetic pipeline (e.g. in a case where the dispatch is not carried out several time continuously), an instruction is dispatched from the second reservation station to the first arithmetic pipeline, especially. That is, without increasing the complexity of the instruction output logic, the arithmetic pipeline can be effectively utilized.

In addition, the aforementioned controller may detect either of the normal mode and the specific operation mode by receiving a signal representing whether or not a dispatch is carried out, from the first and second reservation station. At that time, in the specific operation mode, after an instruction is dispatched from the second reservation station to the first arithmetic pipeline, when a dispatch dispatchable instruction exists in the entries of the first reservation station, the first reservation station may output a signal representing a dispatch was carried out to the controller. This is to return to the normal mode in the next cycle by the simple logic.

Furthermore, when the controller detects a second specific mode that an instruction is not dispatched from the second reservation station to the second arithmetic pipeline, the controller may control station to the second arithmetic pipeline, the controller may control the first reservation station to dispatch an instruction to the second arithmetic pipeline in addition to the first arithmetic pipeline. Thus, a configuration that the first and second reservation stations compensate each other may be adopted.

A processor apparatus according to a second aspect of this invention has a plurality of reservation stations having a plurality of entries; a plurality of arithmetic pipelines; and a controller for the plurality of reservation stations. Then, in a normal mode, a first reservation station of the plurality of reservation stations is associated with a first arithmetic pipeline of the plurality of arithmetic pipelines, and in the normal mode, a second reservation station other than the first reservation station among the plurality of reservation stations is associated with a second arithmetic pipeline other than the first arithmetic pipeline among the plurality of arithmetic pipelines. In addition, when the controller detects a specific operation mode that the second reservation station becomes vacant or the number of instructions stored in the entries of the first reservation station is greater than the number of instructions stored in the entries of the second reservation station, a predetermined value or more, the controller controls the first reservation station to move an instruction stored in the first reservation station to the second reservation station.

Thus, in the specific operation mode that the second reservation station becomes vacant, or the number of instructions stored in the entries of the first reservation station is greater than the number of instructions stored in the entries of the second reservation station, a predetermined number or more, an instruction stored in the entry of the first reservation station is moved to the second reservation station. That is, without increasing the complexity of an instruction allocation logic in the decoder to the pipeline is realized.

In addition, the aforementioned specific operation mode may be identified when a state is further detected that an instruction is not dispatched from the second reservation station to the second arithmetic pipeline. This is because, when the reservation station is not vacant and holds a dispatchable instruction, there is no need to move an instruction between the reservation stations.

Furthermore, the aforementioned controller may receive a signal representing whether or not a dispatch is carried out to an associated arithmetic pipeline from the first and second reservation stations. At that time, in the specific operation mode, after an instruction is moved from the first reservation station to the second reservation station, the second reservation station may output the signal representing a dispatch was carried out to the second reservation station. This is to return to the normal mode in the next cycle by the simple logic.

Furthermore, when the controller detects a second specific operation that an instruction is not dispatched from the first reservation station to the first arithmetic pipeline, the controller may control the second reservation station so as to dispatch an instruction to the first arithmetic pipeline in addition to the second arithmetic pipeline. By combining the first and second aspects of this invention, it becomes possible to further efficiently utilize the arithmetic pipelines.

A processor device according to a third aspect of this invention has one reservation station having a plurality of entries; and a plurality of arithmetic pipelines. Then, a priority is set to each of the plurality of entries, and when an entry having an upper-level priority is vacant, an instruction in an entry having a lower-level priority is moved to the entry having the upper-level priority, and the plurality of entries are categorized into groups whose number is priority is moved to the entry having the upper-level priority, and the plurality of entries are categorized into groups whose number is the same as the number of arithmetic pipelines, and each group is associated with one of the arithmetic pipelines. In addition, when a difference between the numbers of instructions stored in the entries belonging to each group or a difference between frequencies that an instruction is dispatched from each group to a corresponding arithmetic pipeline is equal to or greater than a predetermined level, the groups are reconstructed by the top predetermined number of entries among the plurality of entries.

Thus, even in a case where one reservation station is used, when the difference between the numbers of instructions stored in the entries belonging to each group or the difference between the frequencies that an instruction is dispatched from each group is equal to or greater than a predetermined level, the groups, which are composed of the entries, are reconstructed. Accordingly, the efficient dispatch of the instructions can be carried out. That is, without making the instruction output logic from the reservation station to the arithmetic pipeline complicated, the efficient utilization of the arithmetic pipelines is enabled. Even when the multi-thread processing method is adopted, this is useful.

A processor device according to a fourth aspect of this invention has one reservation station having a plurality of entries; a plurality of arithmetic pipelines; a switching unit connecting the reservation station with the plurality of arithmetic pipelines; and a controller for the switching unit. Then, a priority is set to each of the plurality of entries, and when an entry having an upper-level priority is vacant, an instruction in an entry having a lower-level priority is moved to the entry having the upper-level priority. In addition, the aforementioned controller switches (1) a first mode that each of the plurality of entries is associated with one of the plurality of arithmetic pipelines, and the controller controls the switching unit so that an instruction can be outputted from one of the entries associated with a specific arithmetic pipeline to the specific arithmetic pipeline, and (2) a second mode that each of entries of the top predetermined number among the plurality of entries is associated with one of the plurality of arithmetic pipelines, and the controller controls the switching unit so that an instruction can be outputted from one of the entries associated with a particular arithmetic pipeline to the particular arithmetic pipeline, when a difference between the numbers of instructions stored in the entries belonging to each group or a difference between frequencies that an instruction is dispatched from each group to a corresponding arithmetic pipeline is equal to or greater than a predetermined level.

Thus, by mutually switching the first and second modes, the utilization efficiency of the arithmetic pipelines can be improved without making the instruction output logic complicated. Even when the multi-thread processing method is adopted, it is useful.

In addition, the second mode may be divided into a plurality of modes according to the top predetermined number. This is because an old instruction is efficiently outputted to the arithmetic pipeline.

Furthermore, the entries associated with the same arithmetic pipeline may be consecutive entries of the predetermined number, from an entry having an upper-level priority to an entry having a lower-level priority.

Moreover, when the difference between the numbers of instructions stored in the entries belonging to each group or the difference between frequencies that the instruction is dispatched from each group is equal to or greater than the predetermined level, modes may be switched according to a state, in a next cycle, of the instructions stored in a specific entry in the reservation station.

A processor device according to a fifth aspect of this invention has one reservation station having a plurality of entries; and a plurality of arithmetic pipelines. Then, a priority is set to each of the plurality of entries, and when an entry having an upper-level priority is vacant, an instruction in an entry having a lower-level priority is moved to the entry having the upper-level priority, and the plurality of entries is categorized into groups whose number is the same as the number of arithmetic pipelines, and an instruction is dispatched from an entry having the highest priority in the same group and storing a dispatchable instruction to an arithmetic pipeline corresponding to the group.

By adopting such a configuration, when the entries included in the group are dispersive so that their priorities are not concentrated, it is possible that the bubble of the arithmetic pipelines does not occur for the increase or decrease of the vacant entries. The purpose is to output an old instruction to the arithmetic pipeline more efficiently.

Moreover, the aforementioned group may be composed of entries having a priority order at intervals of the number of arithmetic pipelines.

In addition, the first or second aspects may be applied to the third to fifth aspects.

BRIEF DESCRIPTION OF THE DRAWINGS

FIG. 12 is a diagram showing a table to determine a mode in the third embodiment;

DETAILED DESCRIPTION OF THE PREFERRED EMBODIMENTS

Figure 1A:
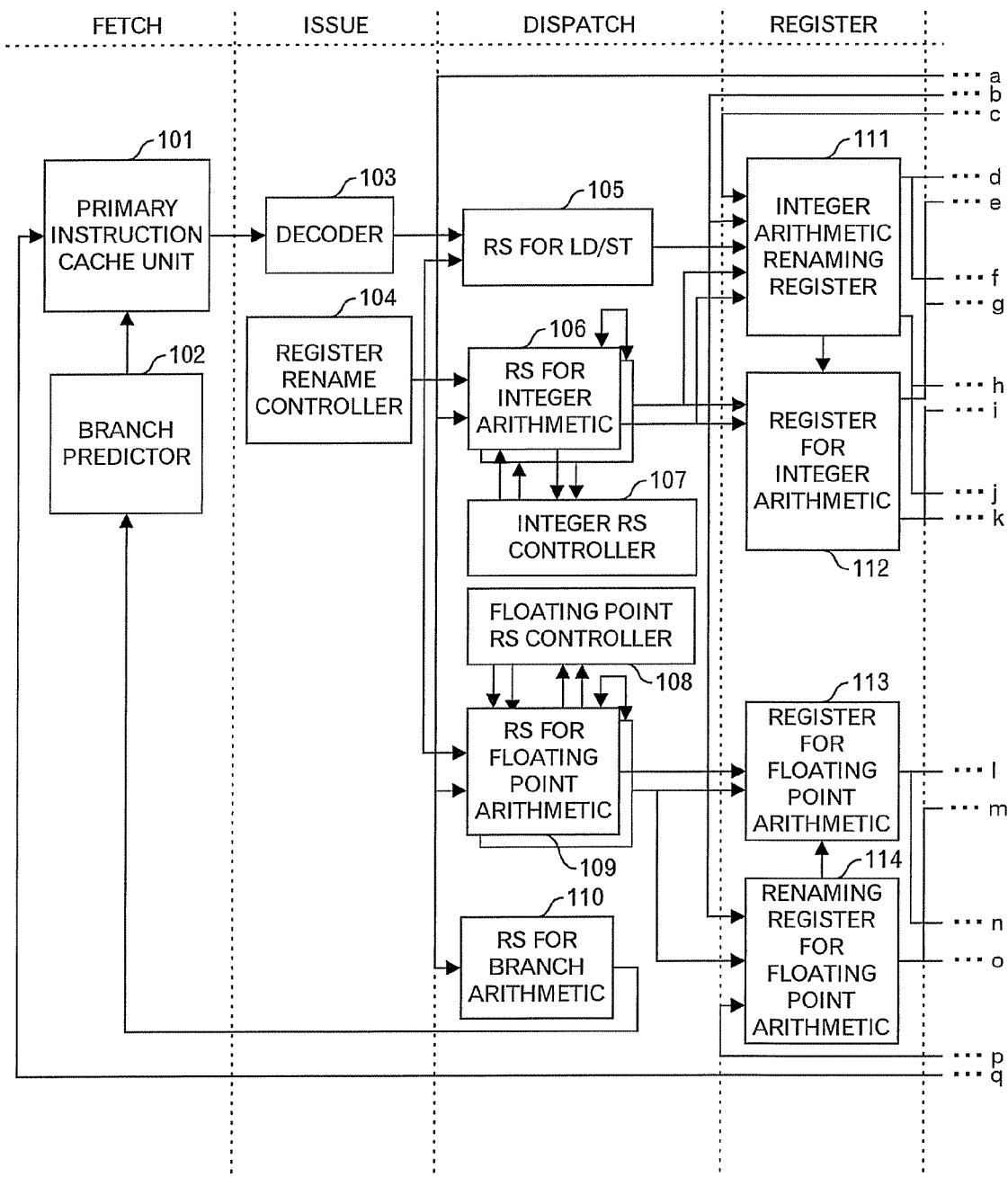
FIGS. 1A and 1B are a functional block diagram showing a processor device in an embodiment of this inventions.
Figure 1B:
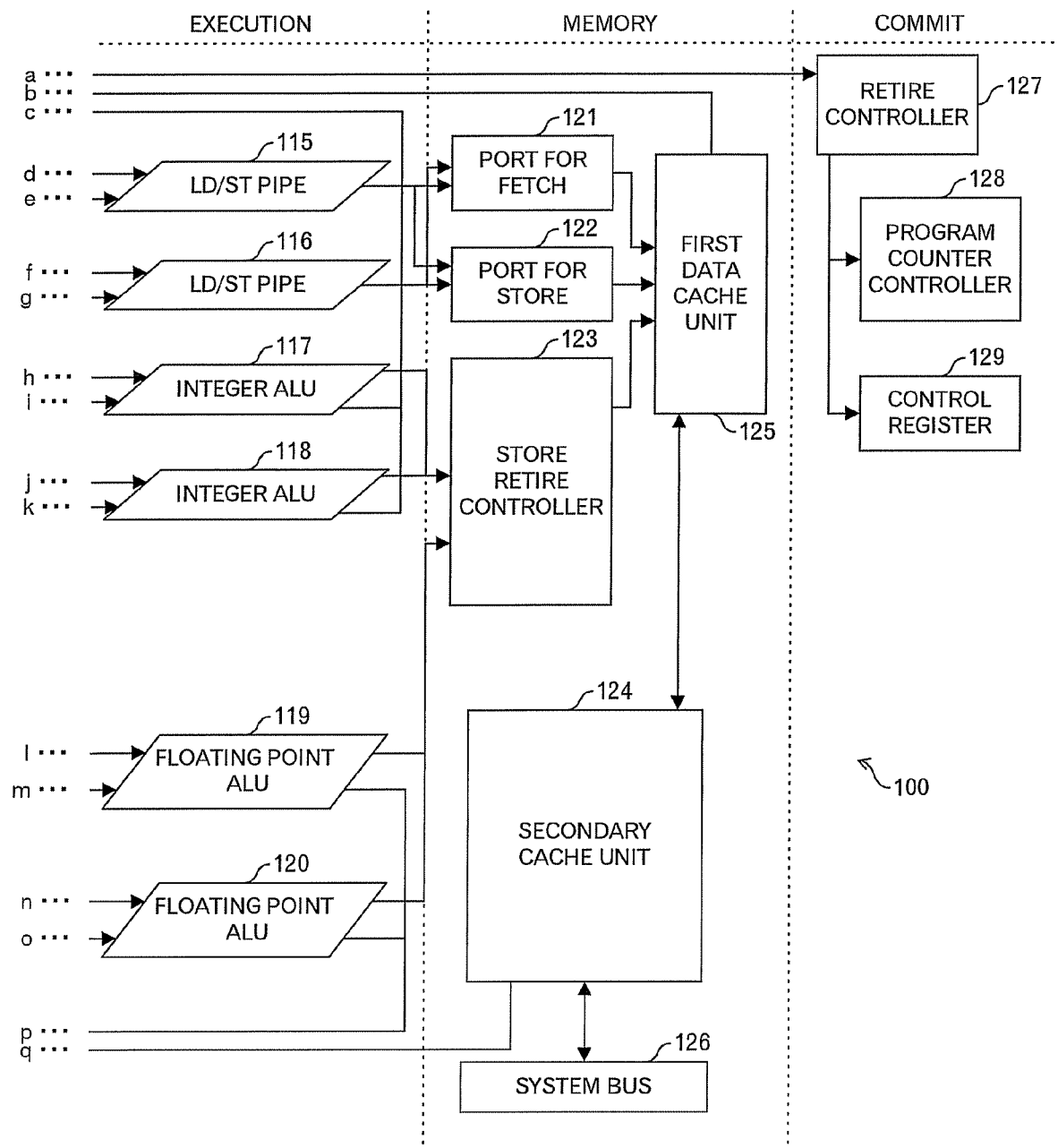

FIGS. 1A and 1B show a functional block diagram of a processor device 100 in an embodiment of this invention. The processor device 100 according to this embodiment has a fetch unit, an issue unit, a dispatch unit, a register unit, an execution unit, a memory unit and a commit unit. The fetch unit includes a fetch pipeline unit (not shown), a primary instruction cache unit 101 and a branch predictor 102. The issue unit includes a decoder 103 and a register rename controller 104. The dispatch unit includes a reservation station (RS) 105 for Load/Store (LD/ST), a RS 106 for the integer arithmetic, an integer RS controller 107, a floating point RS controller 108, a RS 109 for the floating point arithmetic, and a RS 110 for the branch arithmetic. The register unit includes an integer arithmetic renaming register 111, a register 112 for the integer arithmetic, a register 113 for the floating point arithmetic, and a renaming register 114 for the floating point arithmetic. The execution unit includes LD/ST pipes 115 and 116, integer arithmetic logic units (ALUs) 117 and 118, and floating point ALUs 119 and 120. The memory unit includes a port 121 for the fetch, a port 122 for the store, a store retire controller 123, a primary data cache unit 125 and a secondary cache unit 124. The commit unit includes a retire controller 127, a program counter controller 128 and a control register 129.

Next, typical connections between the functional blocks in the processor device 100 shown in FIGS. 1A and 1B will be explained. The fetch pipe unit is connected with the primary instruction cache unit 101, the secondary cache unit 124, the branch predictor 102, the decoder 103 and a program counter (although not shown). In addition, the branch predictor 102 is connected with the RS 110 for the branch arithmetic and a retire controller (although not shown). Furthermore, the decoder 103 is connected with the RS 105 for LD/ST. Incidentally, although it is not shown, the decoder 103 is also connected with the RS 106 for the integer arithmetic, the RS 109 for the floating point arithmetic, the register rename controller 104, the retire controller 127, the port 121 for the fetch, the port 122 for the store, and the store retire controller 123. Moreover, the register rename controller 104 is connected with the RS 105 for LD/ST, the RS 106 for the integer arithmetic, the RS 109 for the floating point arithmetic, and, although they are not shown, with the renaming register and the register. Incidentally, the RS 106 for the integer arithmetic, the RS 109 for the floating point arithmetic and the RS 110 for the branch arithmetic are connected with the retire controller 127. In addition, in FIGS. 1A and 1B, keeping first and second embodiments in mind, an example is indicated in which the plural RS 106 for the integer arithmetic 106 and RS 109 for the floating point arithmetic are provided. However, like third and fourth embodiments, only one RS 106 for the integer arithmetic and only one RS 109 for the floating point arithmetic may be provided. In addition, in the second embodiment, as shown in FIGS. 1A and 1B, the RS 106 for the integer arithmetic may be mutually connected, and the RS 109 for the floating point arithmetic may be mutually connected.

The integer RS controller 107 is connected to the RS 106 for the integer arithmetic, and the floating point RS controller 108 is connected to the RS 109 for the floating point arithmetic. In addition, the integer RS controller 107 receives an output signal from a state judgment and selection unit in the RS 106 for the integer arithmetic. Similarly, the floating point RS controller 108 receives an output signal from a state judgment and selection unit in the RS 109 for the floating point arithmetic.

In addition, the RS 105 for LD/ST is connected to the integer arithmetic renaming register 111. Then, the RS 106 for the integer arithmetic is connected to the integer arithmetic renaming register 111 and the register 112 for the integer arithmetic. Moreover, the RS 109 for the floating point arithmetic is connected to the register 113 for the floating point arithmetic and the renaming register 114 for the floating point arithmetic. The primary data cache unit 125 is also connected to the integer arithmetic renaming register 111 and the renaming register 114 for the floating point arithmetic. Furthermore, the integer ALUs 117 and 118 are connected to the integer arithmetic renaming register 111, and the floating point ALUs 119 and 102 are connected to the renaming register 114 for the floating point arithmetic.

The integer arithmetic renaming register 111 is connected to the register 112 for the integer arithmetic, the LD/ST pipes 115 and 116, and the integer ALUs 117 and 118. The register 112 for the integer arithmetic is also connected to the LD/ST pipes 115 and 116 and the integer ALUs 117 and 118. Furthermore, the renaming register 114 for the floating point arithmetic is connected to the register 113 for the floating point arithmetic and the floating point ALUs 119 and 120. The register 113 for the floating point arithmetic is connected to the floating point ALUs 119 and 120.

The LD/ST pipes 115 and 116 are connected to the port 112 for the fetch and the port 122 for the store, and the integer ALUs 117 and 118 are connected to the store retire controller 123. In addition, the floating point ALUs 119 and 120 are connected to the store retire controller 123.

The port 121 for the fetch, the port 122 for the store and the store retire controller 123 are connected to the primary data cache unit 125. The primary data cache unit 125 is also connected to the secondary cache unit 124. The secondary cache unit 124 is also connected to the system bus 126 in the processor device 100. Furthermore, the retire controller 127 is connected to the program counter controller 128 and the control register 129.

As for each function and operation of the processor device 100 shown in FIGS. 1A and 1B, because portions other than the RS 106 for the integer arithmetic, the integer RS controller 107, the floating point RS controller 108 and the RS 109 for the floating point arithmetic are the same as the conventional ones, the explanation for those is omitted here. Incidentally, in this application, not only the instruction processing stage in the entire processor device 100 shown in FIGS. 1A and 1B but also the instruction processing stage subsequent to the reservation station are called "the arithmetic pipeline".

Embodiment 1

Figure 2:
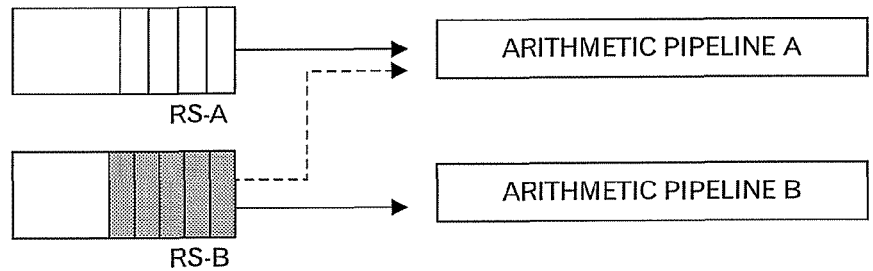
FIG. 2 is an outline diagram in a first embodiment of this invention.

FIG. 2 shows an outline diagram in the first embodiment. In FIG. 2, a first reservation station RS-A and a second reservation station RS-B are provided, and the first reservation station RS-A is associated with an arithmetic pipeline A in principle, and the second reservation station RS-B is associated with an arithmetic pipeline B in principle. Thus, when one-to-one association is made between the reservation station and the arithmetic pipeline, there is a merit that a processing to judge which instruction among the instructions held in the reservation stations should be outputted to the arithmetic pipeline becomes simple. On the other hand, when there is no instruction dispatchable in the reservation station, because any instruction cannot be dispatched to the arithmetic pipeline, bubbles occurs in the arithmetic pipeline, and accordingly the execution efficiency is lowered. Then, as shown in FIG. 2, for example, one set is composed of the first reservation station RS-A and the second reservation station RS-B, and when any dispatchable instruction does not exist in the first reservation station RS-A, the second reservation station RS-B selects two dispatchable instructions having high priority, outputs one instruction having highest priority to the corresponding arithmetic pipeline B, and outputs another instruction whose priority is high in the second to the arithmetic pipeline A as shown by dotted lines. By adopting such a configuration, the arithmetic pipeline can be efficiently utilized.

Figure 3:
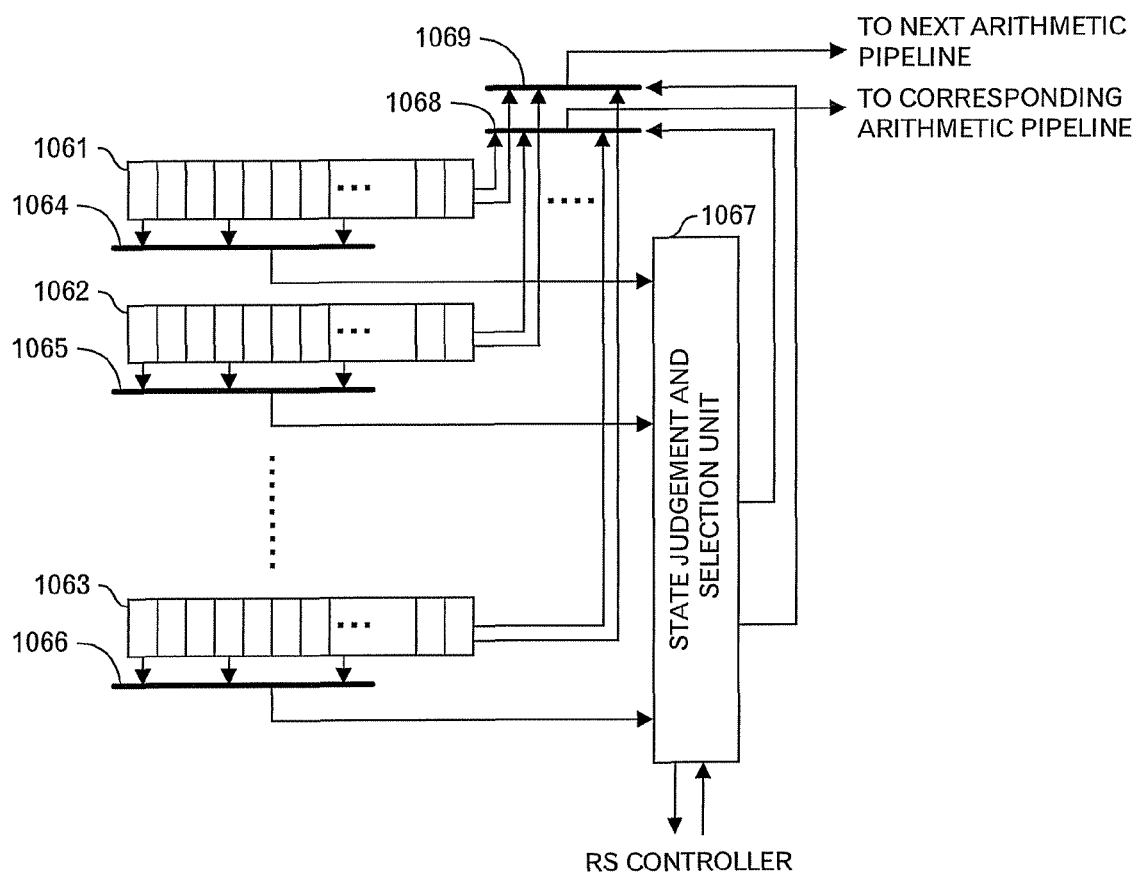
FIG. 3 is a diagram showing a circuit example of a reservation station in the first embodiment.

In order to implement the outline of this embodiment shown in FIG. 2, for example, a RS 106a for the integer arithmetic (the RS 106 for the integer arithmetic includes a RS 106a for the integer arithmetic and a RS 106b for the integer arithmetic.) has a configuration as shown in FIG. 3. The RS 106a for the integer arithmetic has first to n-th entries 1061 to 1063, circuits 1064 to 1066, which are, for example, AND circuits, a state judgment and selection unit 1067, a first selector 1068 and a second selector 1069. In FIG. 3, connection lines to the decoder 103 and the like are omitted. The entries 1061 to 1063 hold bits to judge whether or not the dispatch to the arithmetic pipeline can be carried out, operand information, and data such as data reference source and data definition destination. In the first entry 1061, bit storages used to judge whether or not the dispatch can be carried out are connected to the circuit 1064, and in the second entry 1062, bit storages used to judge whether or not the dispatch can be carried out are connected to the circuit 1065, and in the n-th entry 1063, bit storages used to judge whether or not the dispatch can be carried out are connected to the circuit 1066. In addition, the first to n-th entries 1061 to 1063 are respectively connected to inputs of the first and second selectors 1068 and 1069. The state judgment and selection unit 1067 is connected to outputs of the circuits 1064 to 1066, control inputs of the first and second selectors 1068 and 1069 and the integer RS controller 107. The first selector 1068 is connected to an arithmetic pipeline corresponding to this RS 106a for the integer arithmetic and the second selector 1069 is connected to an arithmetic pipeline corresponding to the RS 106b for the integer arithmetic.

The bits in the first entry 1061, which are used to judge whether or not the dispatch can be carried out, are ANDed by the circuit 1064, and when all bits are "1", the ON signal representing the dispatch can be carried out is outputted to the state judgment and selection unit 1067. The second to n-th entries 1062 and 1063 operates similarly to the first entry 1061. When the integer RS controller 107 instructs a normal mode (a mode that an instruction is outputted only to a corresponding arithmetic pipeline.), the state judgment and selection unit 1067 instructs the first selector 1068 to dispatch data (i.e. instruction) stored in an entry having the highest priority among entries corresponding to the circuits that outputted the ON signal, to a corresponding arithmetic pipeline. Then, the dispatchable instruction is outputted from the entry having the highest priority and holding the pertinent instruction to the corresponding arithmetic pipeline. For example, it is assumed that the priority of the first entry 1061 is the highest, and the priority of the n-th entry 1063 is the lowest. Incidentally, in the normal mode, any selection instruction to the second selector 1069 is not made. In addition, there is a case where the state judgment and selection unit 1067 detects a state that all of the circuits 1064 to 1066 output an OFF signal representing the dispatch cannot be carried out, that is, a state that there is no dispatchable instruction in any entries. In such a case, the dispatch instruction is not carried out even to the first selector 1068. After that, the state judgment and selection unit 1067 outputs a signal representing whether or not the dispatch was carried out to the integer RS controller 107.

On the other hand, when the integer RS controller 107 instructs a special mode (a mode that an instruction is also outputted to a neighboring arithmetic pipeline), the state judgment and selection unit 1067 instructs the first selector 1068 to dispatch data (i.e. instruction) stored in an entry having the highest priority among the entries corresponding to the circuits, which outputted the ON signal, to a corresponding arithmetic pipeline, and also instructs the second selector 1069 to dispatch data (i.e. instruction) stored in the entry whose priority is the second among the entries corresponding to the circuits, which outputted the ON signal, to a neighboring arithmetic pipeline (here, an arithmetic pipeline associated with the RS 106b for the integer arithmetic). Then, the dispatchable instruction is outputted from the entry having the highest priority and holding the pertinent instruction to the corresponding arithmetic pipeline, and the dispatchable instruction is outputted from the entry whose priority is the second and holding the pertinent instruction to the neighboring arithmetic pipeline. Incidentally, when there is only one dispatchable instruction, that instruction is outputted only to the corresponding arithmetic pipeline. When there is no dispatchable instruction, any instruction is not outputted to any arithmetic pipelines. The state judgment and selection unit 1067 outputs a signal representing whether or not the dispatch was carried out, to the integer RS controller 107.

Incidentally, the similar processing is also carried out in the RS 109 for the floating point arithmetic and the floating point RS controller 108. In addition, when an instruction is outputted to the arithmetic pipeline, an instruction stored in the lower-level entry is moved to an upper-level empty entry.

Figure 4:
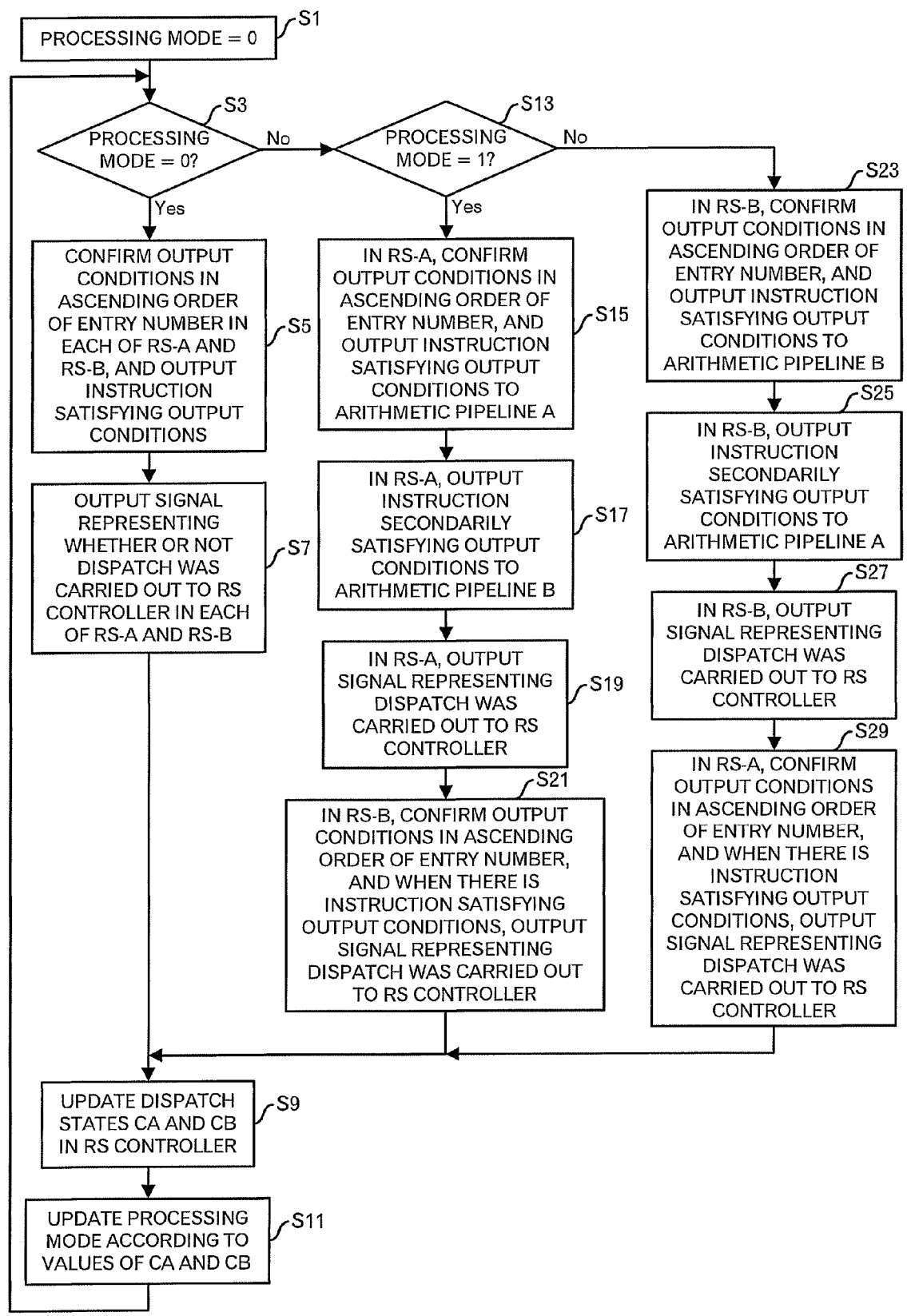
FIG. 4 is a diagram showing a processing flow in the first embodiment.

FIG. 4 shows the detailed operation of the reservation station shown in FIG. 3. Incidentally, "the processing mode=0" represents the normal mode, and "the processing mode=1" represents a special mode that an instruction is also outputted from the first reservation station RS-A to the arithmetic pipeline B associated with the second reservation station RS-B, and "the processing mode=2" also represents a special mode that an instruction is also outputted from the second reservation station RS-B to the arithmetic pipeline A associated with the first reservation station RS-A.

First, the integer RS controller 107 initializes the processing mode as "0" (step S1). Then, it judges whether or not "0" is set to the processing mode (step S3). In a case of the processing mode=0, it notifies the state judgment and selection unit 1067 of each reservation station of the normal mode. Each of the state judgment and selection units 1067 of the first reservation station RS-A and the second reservation station RS-B confirms output conditions (i.e. instruction dependency and vacancy of the arithmetic resources) in an ascending order of the entry number (i.e. in a descending order of the priority) by the output signals from the aforementioned circuits 1064 to 1066, and causes the first selector 1068 to output an instruction in an entry, which firstly satisfied the output conditions, to a corresponding arithmetic pipeline (step S5). Rightly, when there is no instruction satisfying the output conditions, any dispatch is not carried out.

In addition, each of the state judgment and selection units 1067 of the first reservation station RS-A and the second reservation station RS-B outputs a signal representing whether or not the dispatch was carried out to the integer RS controller 107 (step S7). The integer RS controller 107 updates a value of a management variable CA representing a dispatching state of the first reservation station RS-A and a value of a management variable CB representing a dispatching state of the second reservation station RS-B based on the signals representing whether or not the dispatch was carried out (step S9). That is, when a signal representing that the dispatch was carried out is received, "0" is set to the management variable (i.e. CA or CB) by the update. In addition, when a signal representing that the dispatch was not carried out is received, "the management variable (i.e. CA or CB)+1" is set to the management variable (i.e. CA or CB) by the update. Then, the integer RS controller 107 updates the processing mode according to the values of CA and CB (step S11). In a case of CA=0 and CB>=3, "2" is set to the processing mode, and in a case of CA>=3 and CB=0, "1" is set to the processing mode. In the other cases, "0" is set to the processing mode. That is, it tries to detect a state that an instruction is outputted from one reservation station to the arithmetic pipeline but any instruction is not outputted from another reservation station three times in a row. Thus, when the issuable instructions are biased (cases including a case where the numbers of stored instructions are biased, a case where the characteristics of instructions are different and the like), the processing mode is changed in order to correct the biased state. In a case of "the processing mode=1", as described in detail later, the first special mode that instructions are dispatched from the first reservation station RS-A to the arithmetic pipelines A and B is realized. On the other hand, in a case of "the processing mode=2", as described in detail later, the second special mode that instructions are dispatched from the second reservation station RS-B to the arithmetic pipelines A and B is realized. Then, the processing returns to the step S3 after the step S11.

In addition, when it is judged at the step S3 that "0" is not set to the processing mode, the integer RS controller 107 judges whether or not "1" is set to the processing mode (step S13). In a case of "the processing mode=1", the state judgment and selection unit 1067 in the reservation station RS-A confirms the output conditions (e.g. instruction dependency and vacancy of the arithmetic resources) in an ascending order of the entry number (i.e. in a descending order of the priority) by the output signals from the aforementioned circuits 1064 to 1066, and causes the first selector 1068 to output an instruction in an entry, which firstly satisfies the output conditions, to the corresponding first arithmetic pipeline A (step S15). Rightly, when there is no instruction satisfying the output conditions, the dispatch is not carried out. Next, the state judgment and selection unit 1067 in the first reservation station RS-A further confirms the output conditions by the output signals from the aforementioned circuits 1064 to 1066, and causes the second selector 1069 to output an instruction, which secondarily satisfies the output condition, to the second arithmetic pipeline B (step S17). Then, the state judgment and selection unit 1067 in the first reservation station RS-A outputs a signal representing the dispatch was carried out when the dispatch was carried out, and a signal representing the dispatch was not carried out when the dispatch was not carried out, to the integer RS controller 107 (step S19). On the other hand, the state judgment and selection unit 1067 in the second reservation station RS-B confirms the output conditions (e.g. instruction dependency and vacancy of the arithmetic resources) in an ascending order of the entry number (i.e. in a descending order of the priority) by the output signals from the aforementioned circuits 1064 to 1066, and when there is an instruction satisfying the output conditions, the state judgment and selection unit 1067 outputs a signal representing that the dispatch was carried out to the integer RS controller 107 without the dispatch (step S21). Incidentally, when there is no instruction satisfying the output conditions, a signal representing the dispatch was not carried out is outputted to the integer RS controller 107. After that, the processing shifts to the step S9. When the signal representing the dispatch was carried out is outputted at the step S21, because CB=0 is set at the step S9, the processing mode returns to "0", and an instruction is dispatched from the second reservation station RS-B to the arithmetic pipeline B.

Furthermore, when it is judged at the step S13 that "1" is not set to the processing mode, "2" has been set to the processing mode. The state judgment and selection unit 1067 in the reservation station RS-B confirms the output conditions (e.g. instruction dependency and vacancy of the arithmetic resources) in an ascending order of the entry number (i.e. in a descending order of the priority) by the output signals from the aforementioned circuit 1064 to 1066, and causes to output an instruction in an entry, which firstly satisfied the output conditions, through the first selector 1068 to the corresponding second arithmetic pipeline B (step S23). Rightly, when there is no instruction satisfying the output conditions, the dispatch is not carried out. Next, the state judgment and selection unit 1067 in the second reservation station RS-B further confirms the output condition by the signals from the aforementioned circuits 1064 to 1066, and instructs the second selector 1069 to output an instruction in an entry, which secondarily satisfied the output conditions, to the first arithmetic pipeline A (step S25). Then, the state judgment and selection unit 1067 in the second reservation station RS-B outputs a signal representing that the dispatch was carried out when the dispatch was carried out, and a signal representing the dispatch was not carried out when the dispatch was not carried out, to the integer RS controller 107 (step S27). On the other hand, the state judgment and selection unit 1067 in the first reservation station RS-A confirms the output conditions (e.g. instruction dependency and vacancy of the arithmetic resources) in an ascending order of the entry number (i.e. in a descending order of the priority) by the output signals from the aforementioned circuits 1064 to 1066, and when there is an instruction satisfying the output conditions, the state judgment and selection unit 1067 outputs a signal representing the dispatch was carried out, to the integer RS controller 107, without the dispatch (step S29). Incidentally, when there is no instruction satisfying the output conditions, a signal representing the dispatch was not carried out is outputted to the integer RS controller 107. After that, the processing shifts to the step S9. When the signal representing the dispatch was carried out is outputted at the step S29, because "0" is set to the CA at the step S9, the processing mode returns to "0", and then, an instruction is dispatched from the first reservation station RS-A to the arithmetic pipeline A.

Thus, in a case of the processing mode=1, the second reservation station RS-B is logically separated from the arithmetic pipeline, and in a case of the processing mode=2, the first reservation station RS-A is logically separated from the arithmetic pipeline. Thus, in this embodiment, the unusable reservation station is separated according to the state of the reservation station, and the effective utilization of the arithmetic pipelines can be realized by effectively using the reservation stations from which instructions can be dispatched.

Incidentally, a determination method of the processing mode in the processing flow shown in FIG. 4 is mere an example, and it is possible to use other values for the thresholds of the management variables.

Embodiment 2

Figure 5:
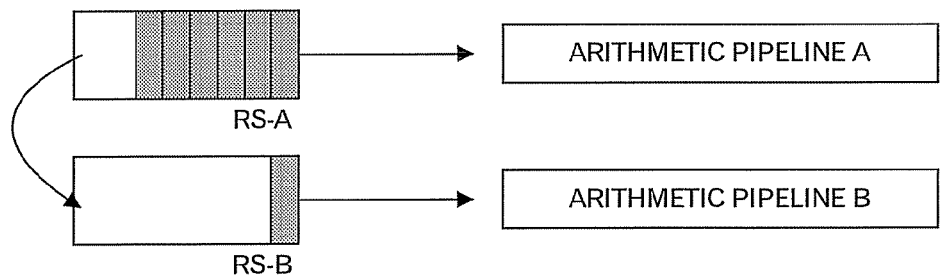
FIG. 5 is an outline diagram in a second embodiment of this invention.

FIG. 5 indicates an outline diagram in the second embodiment. In FIG. 5, a first reservation station RS-A and a second reservation station RS-B are provided, and the first reservation station RS-A is associated with an arithmetic pipeline A, and a second reservation station RS-B is associated with an arithmetic pipeline B. Therefore, when there is no dispatchable instruction in the reservation station, because any instruction cannot be dispatched to the arithmetic pipeline, there is a problem that bubbles occurs in the arithmetic pipeline, and the execution efficiency is lowered. Then, as shown in FIG. 5, for example, one set is composed of the first reservation station RS-A and the second reservation station RS-B, and when there is no dispatchable instruction in the second reservation station RS-B, the first reservation station RS-A selects instructions of the predetermined number, and moves such instructions to the second reservation station RS-B as indicated by an arrow in the figure. By adopting such a configuration, the efficient utilization of the arithmetic pipelines is realized.

Figure 6:
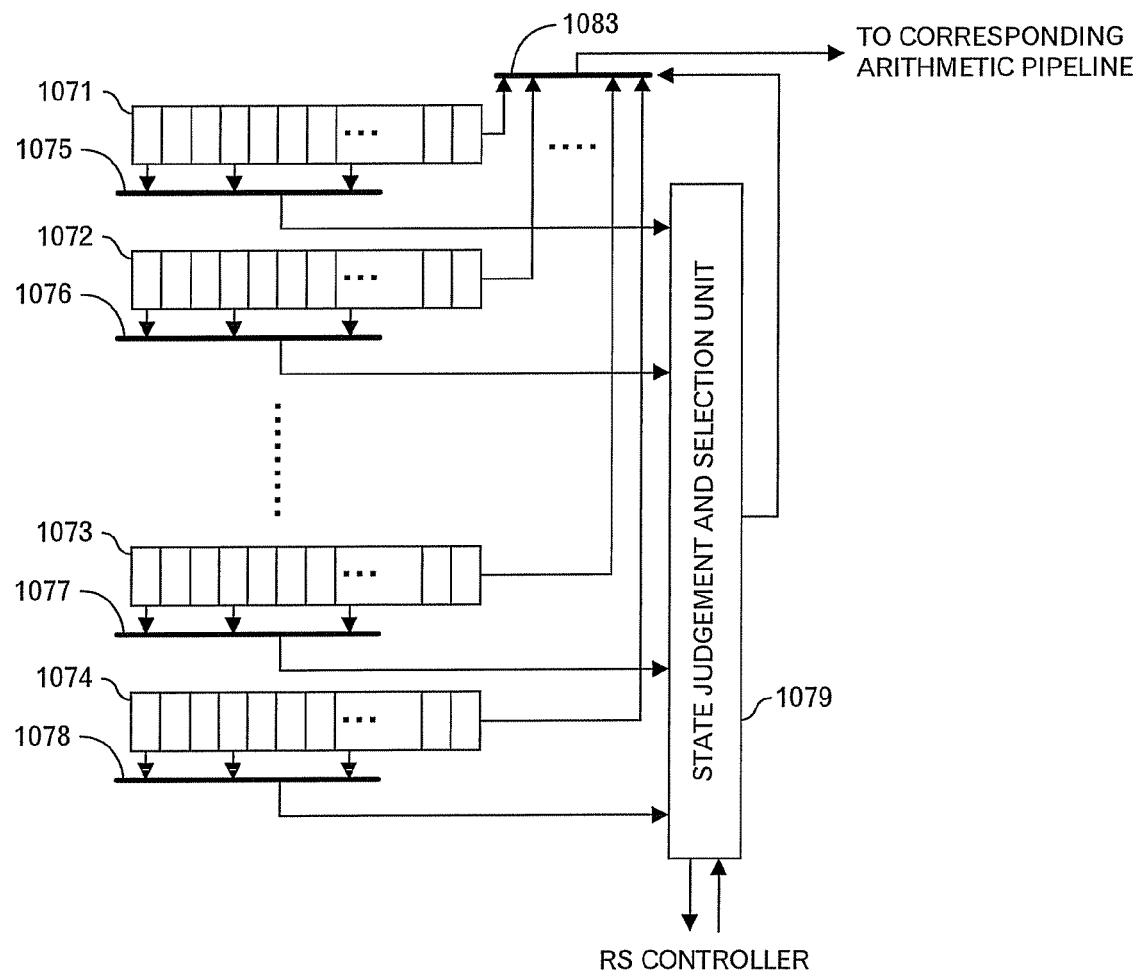
FIG. 6 is a diagram showing a circuit example of the reservation station in the second embodiment.
Figure 7:
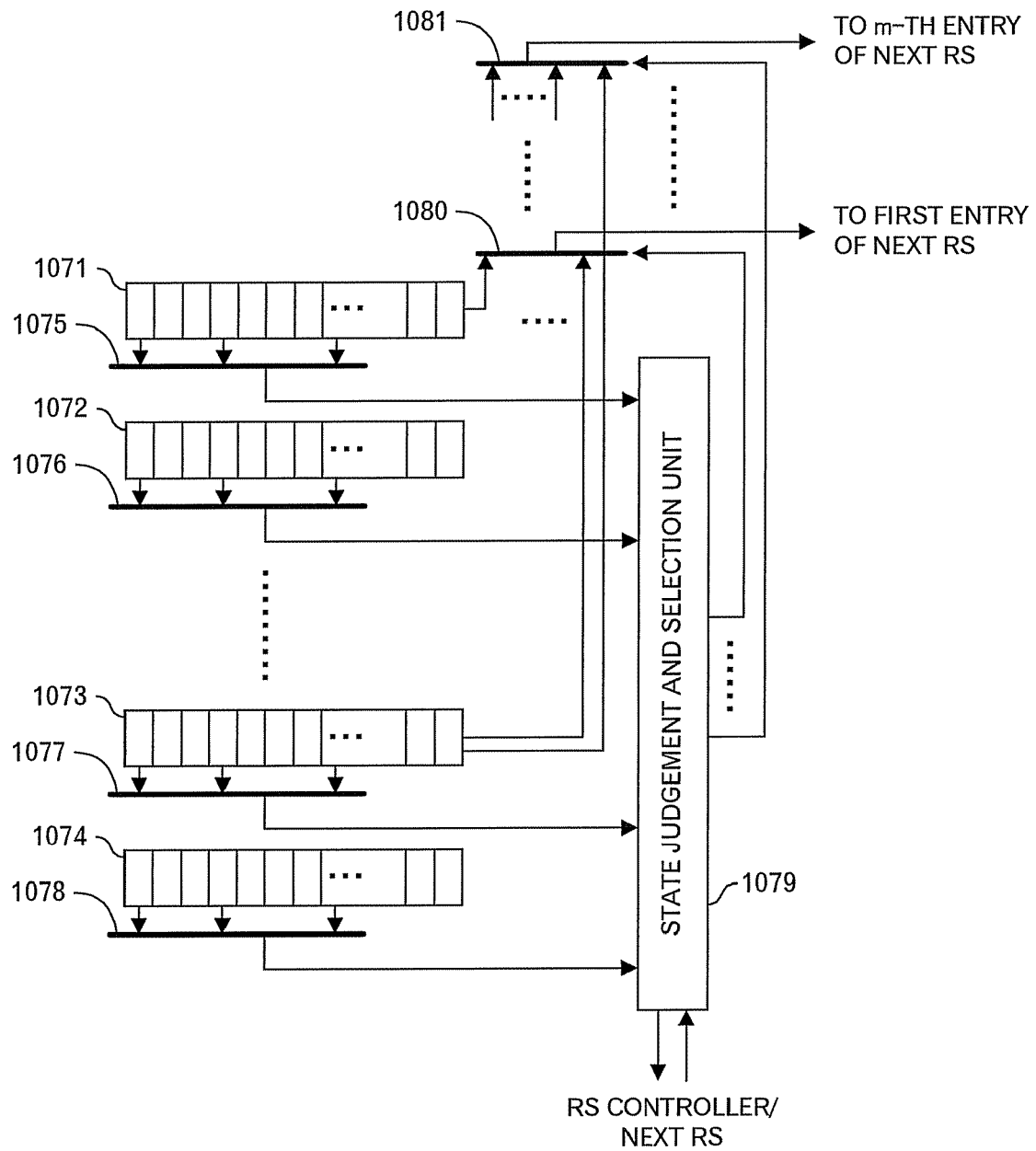
FIG. 7 is a diagram showing a circuit example of the reservation station is the second embodiment.

In order to implement the outline of this embodiment shown in FIG. 5, for example, a RS 106a for the integer arithmetic (it is assumed that the RS 106 for the integer arithmetic includes the RS 106a for the integer arithmetic and a RS 106b for the integer arithmetic.) has a configuration as shown in FIGS. 6 and 7.

First, FIG. 6 shows a configuration in a normal mode. Elements of the RS 106a for the integer arithmetic, which are used in the normal mode, include first to n-th entries 1071 to 1074, circuits 1075 to 1078, which are, for example, AND circuits, a state judgment and selection unit 1079 and a selector 1083. In FIG. 6, connection lines with the decoder 103 and the like are omitted. The entries 1071 to 1074 hold bits to judge whether or not the dispatch to the arithmetic pipeline can be carried out, operand information and data such as data reference source and data definition destination. In the first entry 1071, bit storages used to judge whether or not the dispatch can be carried out are connected to the circuit 1075, and in the second entry 1072, bit storages used to judge whether or not the dispatch can be carried out are connected to the circuit 1076, and in the (n−1)-th entry 1073, bit storages used to judge whether or not the dispatch can be carried out are connected to the circuit 1077, and in the n-th entry 1074, bit storages used to judge whether or not the dispatch can be carried out are connected to the circuit 1078. In addition, the first to n-th entries 1071 to 174 are respectively connected to the selector 1083. The state judgment and selection unit 1079 is connected to outputs of the circuit 1075 to 1078, a control input of the selector 1083 and the integer RS controller 107. The output of the selector 1083 is connected to an arithmetic pipeline corresponding to the RS 106a for the integer arithmetic.

The bits in the first entry 1071, which are used to judge whether or not the dispatch can be carried out, are ANDed by the circuit 1075, and when all bits are "1", an ON signal representing that the dispatch can be carried out is outputted to the state judgment and selection unit 1079. As for the second to n-th entries 1072 to 1074, the similar processing is carried out. When the integer RS controller 107 instructs the normal mode (a mode that an instruction is outputted to a corresponding arithmetic pipeline without moving the instruction to other reservation stations), the state judgment and selection unit 1079 instructs the selector 1083 to dispatch data (i.e. instruction) stored in an entry having the highest priority among entries corresponding to the circuits that outputted the ON signal, to a corresponding arithmetic pipeline. Then, a dispatchable instruction is outputted from the entry having the highest priority and holding a dispatchable instruction to a corresponding arithmetic pipeline. For example, it is assumed that the first entry 1071 has the highest priority, and the n-th entry 1074 has the lowest priority. In addition, there is a case where the state judgment and selection unit 1079 detects a state that all of the circuits 1075 to 1078 output an OFF signal representing the dispatch cannot be carried out, that is, a state that there is no dispatchable instruction in any entries. In such a case, a dispatch instruction is not outputted also to the selector 1083. The state judgment and selection unit 1079 outputs a signal representing whether or not the dispatch was carried out to the integer RS controller 107.

Next, FIG. 7 shows a configuration in a special mode. Elements of the RS 106a for the integer arithmetic, which are used in the special mode, include the first to n-th entries 1071 to 1074, the circuits 1075 to 1078, which are, for example, AND circuits, the state judgment and selection unit 1079 and first to m-th selectors 1080 to 1081. The same reference numbers are attached to the same elements in FIG. 6. In addition, as well as FIG. 6, the connection lines to the decoder 103 and the like are omitted. The difference with FIG. 6 is a point that the first to m-th selectors 1080 to 1081 are provided. Inputs of the first selector 1080 are connected to X entries having the odd entry number (X is a positive integer uniquely determined in the design specification.) from the first entry 1071. In the example of FIG. 7, the inputs of the first selector 1080 are connected to the first entry 1071 and the (n−1)-th entry 1073. In addition, an output of the first selector 1080 is connected to the head entry in the neighboring RS 106b for the integer arithmetic. Moreover, input of the m-th selector 1081 is connected to entries having the odd entry number from the m-th entry. In the example of FIG. 7, the (n−1)-th entry 1073 is connected to the input of the selector 1081. The output of the m-th selector 1081 is connected to the m-th entry in the neighboring RS 106b for the integer arithmetic.

When the special mode is instructed from the integer RS controller 107 and it is notified from the neighboring RS 106b for the integer arithmetic that the RS 106b for the integer arithmetic is vacant, the state judgment and selection unit 1079 selects the top m entries, which store an instruction, among the entries having the odd entry number in addition to the dispatch of the instruction to the arithmetic pipeline by the configuration shown in FIG. 6, and instructs the first to m-th selector 1080 to 1081 to output the instructions stored in the selected entries to the neighboring RS 106b for the integer arithmetic. Incidentally, the entry numbers (ID) of the entries connected to each selector are registered in the state judgment and selection unit 1079, and the state judgment and selection unit 1079 determines, from the upper-level entry, which selector is caused to output the instruction stored in which selected entry, and instructs each selector to output the instruction from which entry. Thus, the instructions are stored in the first to m-th entries in the vacant neighboring RS 106b for the integer arithmetic. Incidentally, the state judgment and selection unit 1079 in the RS 106a for the integer arithmetic outputs a signal representing the dispatch was carried out, to the integer RS controller 107 when an instruction was dispatched to a corresponding arithmetic pipeline, and outputs a signal representing the dispatch was not carried out when the dispatch was not dispatched. On the other hand, the state judgment and selection unit 1079 in the RS 106b for the integer arithmetic outputs the signal representing the dispatch was carried out in case an instruction was received from the RS 106a for the integer arithmetic even when the dispatch was not carried out.

Thus, also in this embodiment, when the bias in the numbers of instructions held by the neighboring reservation stations occurs, an instruction is moved between the reservation stations in order to efficiently utilize the arithmetic pipelines. Incidentally, although a requirement that one of the reservation stations becomes empty in the aforementioned example is adopted, such a configuration may be adopted that when the difference between the numbers of held instructions is equal to or greater than a predetermined number, for example, the instruction is moved. In this case, the movement destination buffer has such a configuration that the entries 1 to N maintains the order the instruction is stored into the entry, it is necessary to take into consideration that this order is not changed.

Figure 8:
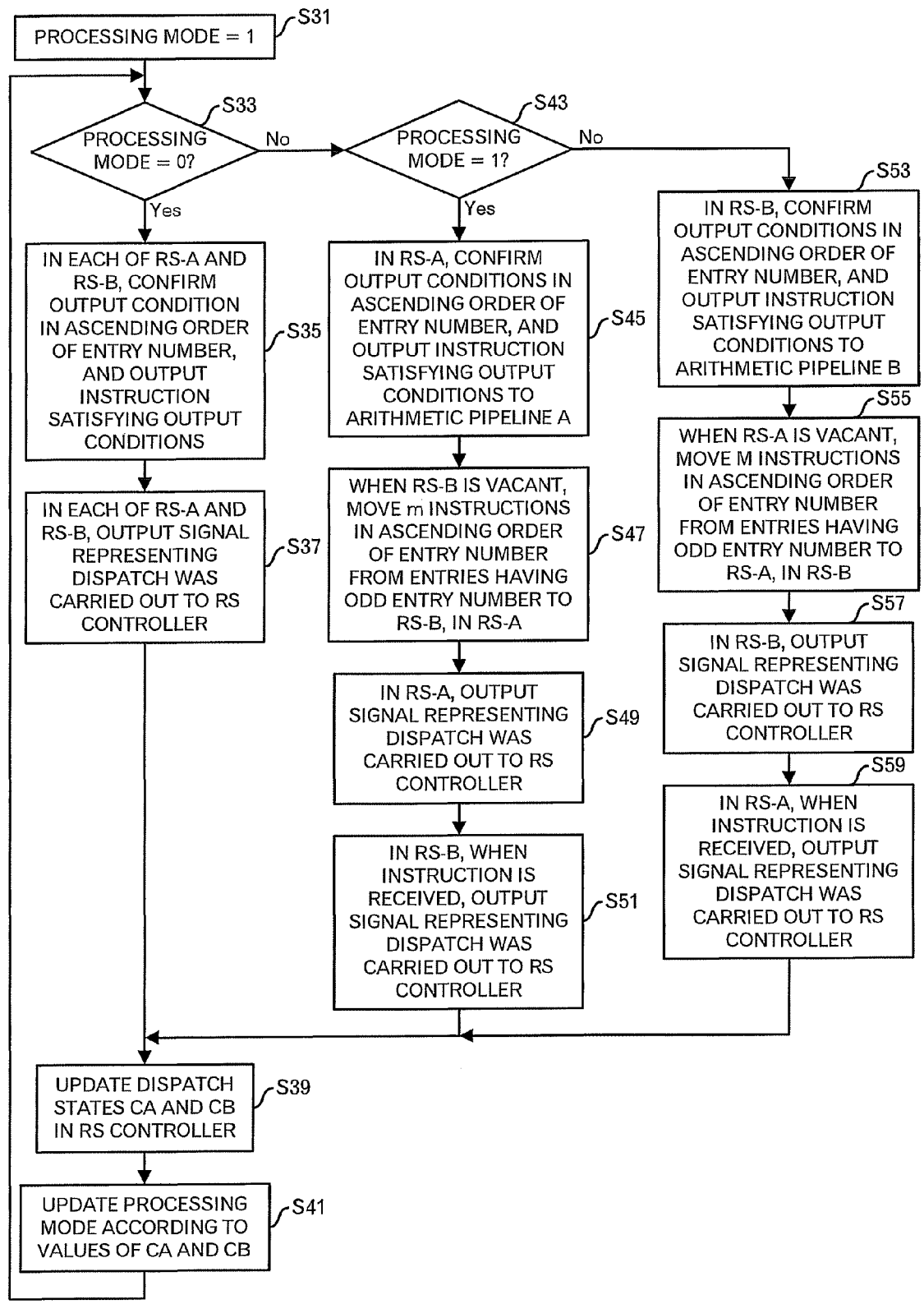
FIG. 8 is a diagram showing a processing flow in the second embodiment.

The detailed operation of the reservation station shown in FIGS. 6 and 7 will be indicated in FIG. 8. Incidentally, "the processing mode=0" indicates the normal mode, "the processing mode=1" indicates the special mode that an instruction is moved from the first reservation station RS-A to the second reservation station RS-B, and "the processing mode=2" indicates the special mode that an instruction is moved from the second reservation station RS-B to the first reservation station RS-A.

First, the integer RS controller 107 initializes the processing mode as "0" (step S31). Then, the integer RS controller 107 judges whether or not "0" is set to the processing mode (step S33). When "0" is set to the processing mode, the integer RS controller 107 notifies the state judgment and selection unit 1079 in each reservation station of the normal mode. Each of the respective state judgment and selection units 1079 of the first reservation station RS-A and the second reservation station RS-B confirms output conditions (e.g. instruction dependency and vacancy of the arithmetic resources) in an ascending order of the entry number (i.e. in a descending order of the priority) by the output signals from the aforementioned circuits 1075 to 1078, and causes the selector 1083 to output an instruction in an entry, which firstly satisfied the output conditions, to a corresponding arithmetic pipeline (step S35). When any instructions cannot be dispatched, any instructions are not outputted to the arithmetic pipeline.

In addition, the respective state judgment and selection units 1079 of the first reservation station RS-A and the second reservation station RS-B output a signal representing whether or not the dispatch was carried out to the integer RS controller 107 (step S37). For example, the number of instructions stored in the reservation station may be outputted to the integer RS controller 107 after a processing that an instruction is moved from the lower entry to the upper entry and a processing that an instruction is stored from the decoder 103 to a vacant entry are carried out.

The integer RS controller 107 updates a value of a management variable CA representing a dispatch state of the first reservation station RS-A and a value of a management variable CB representing a dispatch state of the second reservation station RS-B based on the signals representing whether or not the dispatch was carried out (step S39). That is, when receiving the signal representing the dispatch was carried out, the integer RS controller 107 updates the management variable (CA or CB) to "0". In addition, when receiving the signal representing the dispatch was not carried out, the integer RS controller 107 updates the management variable (CA or CB) to "management variable (CA or CB)+1". Then, the integer RS controller 107 updates the processing mode according to the values of CA and CB (step S41). In a case of CA=0 and CB=3, "2" is set to the processing mode, and in a case of CA=3 and CB=0, "1" is set to the processing mode. That is, a state is detected in which an instruction is outputted from one reservation station but any instruction is not outputted from another reservation station three times in a row. Thus, when the issuable instructions are biased (cases including a case where the numbers of stored instructions are biased), the processing mode is changed in order to correct the biased state. In a case of "the processing mode=1", as described in detail later, a first special mode that an instruction is moved from the first reservation station RS-A to the second reservation station RS-B is realized. On the other hand, in a case of "the processing mode=2", as described in detail later, a second special mode that an instruction is moved from the second reservation station RS-B to the first reservation station RS-A is realized. Then, after step S41, the processing returns to the step S33.

Moreover, when it is judged at the step S33 that "0" is not set to the processing mode, the integer RS controller 107 judges whether or not "1" is set to the processing mode (step S43). In a case of "the processing mode=1", the state judgment and selection unit 1079 of the first reservation station RS-A confirms the output condition (e.g. instruction dependency and vacancy of the arithmetic resources) in an ascending order of the entry number (i.e. in a descending order of the priority) by the output signals from the aforementioned circuits 1075 to 1078, and causes the selector 1083 to output an instruction in an entry, which firstly satisfied the output conditions, to the corresponding first arithmetic pipeline A (step S45). On the other hand, the state judgment and selection unit 1079 of the second reservation station RS-B judges whether or all its own entries are vacant, and when they are vacant, the state judgment and selection unit 1079 outputs a signal representing they are vacant through the integer RS controller 107 or directly to the neighboring reservation station RS-A. When receiving the signal representing the second reservation station RS-B is vacant from the integer RS controller 107 or the state judgment and selection unit 1079, the state judgment and selection unit 1079 of the first reservation station moves m instructions from the entries whose entry number is odd in an ascending order of the entry number through the first and m-th selector 1080 to 1081 to m entries in the second reservation station RS-B (step S47). When there are not m instructions in the first reservation station RS-A, only instructions, which can be moved, are moved.

Then, the state judgment and selection unit 1079 in the first reservation station RS-A outputs to the integer RS controller 107, a signal representing the dispatch was carried out when the dispatch was carried out, and a signal representing the dispatch was not carried out when the dispatch was not carried out (step S49). On the other hand, when an instruction is received from the first reservation station RS-A and is stored into its own entry, the state judgment and selection unit 1079 in the second reservation station RS-B outputs a signal representing the dispatch was carried out to the integer RS controller 107 without the dispatch (step S51). Incidentally, when any instruction is not received from the first reservation station RS-A, a signal representing the dispatch was not carried out is outputted to the integer RS controller 107. After that, the processing shifts to the step S39. When the signal representing the dispatch was carried out is outputted at the step S51, because "0" is set to CB at the step S39, the processing mode returns to "0", and then, when there is a dispatchable instruction, an instruction is dispatched from the second reservation station RS-B to the arithmetic pipeline B.

Furthermore, when it is judged at the step S43 that "1" is not set to the processing mode, "2" is set to the processing mode. Therefore, the state judgment and selection unit 1079 in the second reservation station RS-B confirms the output conditions (e.g. instruction dependency and vacancy of the arithmetic resources) in an ascending order of the entry number (i.e. in a descending order of the priority) by the output signal from the circuits 1075 to 1078, and causes the selector 1083 to output an instruction in an entry, which firstly satisfied the output condition, to the second arithmetic pipeline B (step S53). When any of instructions cannot be dispatched, the instructions are not outputted to the arithmetic pipeline. On the other hand, the state judgment and selection unit 1079 of the first reservation station RS-A judges whether or not all of its own entries are vacant, and when they are vacant, the state judgment and selection unit 1079 outputs the signal representing they are vacant through the integer RS controller 107 or directly to the neighboring second reservation RS-B. When the signal representing the first reservation station RS-A is vacant from the integer RS controller 107 or the state judgment and selection unit 1079 of the first reservation station, the state judgment and selection unit 1079 of the second reservation station RS-B moves m instructions from entries whose entry number is odd in an ascending order of the entry number through the first to m-th selector 1080 to 1081 to m entries in the first reservation station RS-A. When there are no m instructions in the second reservation station RS-B, only instructions, which can be moved, are moved.

Then, the state judgment and selection unit 1079 in the second reservation station RS-B outputs to the integer RS controller 107, the signal representing the dispatch was carried out when the dispatch was carried out and a signal representing the dispatch was not carried out when the dispatch was not carried out (step S57). On the other hand, when receiving an instruction from the second reservation station RS-B and storing the instruction into its own entry, the state judgment and selection unit 1079 in the first reservation station RS-A outputs the signal representing the dispatch was carried out to the integer RS controller 107 without the dispatch (step S59). Incidentally, when any instruction was not received from the second reservation station RS-B, the state judgment and selection unit 1079 outputs the signal representing the dispatch was not carried out to the integer RS controller 107. After that, the processing shifts to the step S39. When outputting the signal representing the dispatch was carried out at the step S59, because "0" is set to the CA at the step S39, the processing mode returns to "0", and then, when there is a dispatchable instruction, the instruction is dispatched from the first reservation station to the arithmetic pipeline A.

Thus, when any instruction is not dispatched to the arithmetic pipeline and the entries in the reservation station become vacant, the utilization efficiency is lowered because the arithmetic pipelines are not used. Therefore, by moving the instruction from the neighboring reservation station to reduce bubbles in the arithmetic pipelines, the utilization efficiency of the arithmetic pipeline is improved.

Incidentally, in the flow of FIG. 8, although a processing to move the instruction from the lower entry to the upper entry, which is vacant, and a processing to issue the instruction by the decoder 103 are not explained, such processings may be carried out after the step S39, for example.

Moreover, although, in the flow of FIG. 8, the processing mode is switched when detecting the instruction is not dispatched to the arithmetic pipeline, it is possible that the instruction is moved according to the number of instructions in the reservation station (whether or not it is vacant, or the difference between the numbers of instructions stored in the neighboring reservation stations is equal to or greater than a predetermined number) without managing the processing mode. In addition, whether or not the instruction should be moved may be determined based on whether or not any dispatchable instruction exists.

Furthermore, it is possible to combine the first embodiment and the second embodiments. Namely, for example, when the dispatch is not carried out three times in a row and the processing mode shifts to the special mode, the instruction is dispatched from the neighboring reservation station, and when the reason why the dispatch is not carried out is the vacancy of the reservation station, the instruction is also moved.

Embodiment 3

Figure 9A:
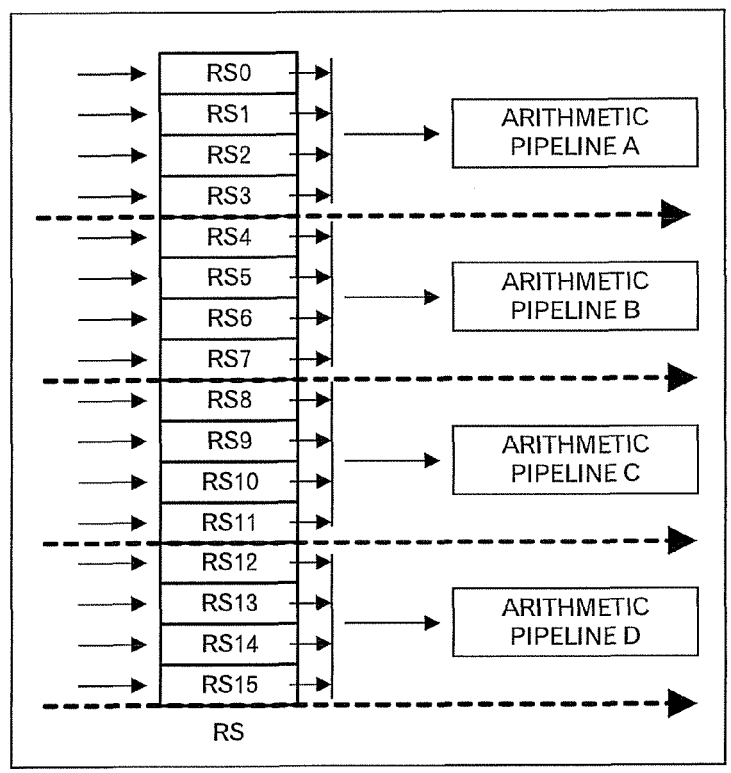
FIGS. 9A and 9B are outline diagrams in a third embodiment of this invention.
Figure 9B:
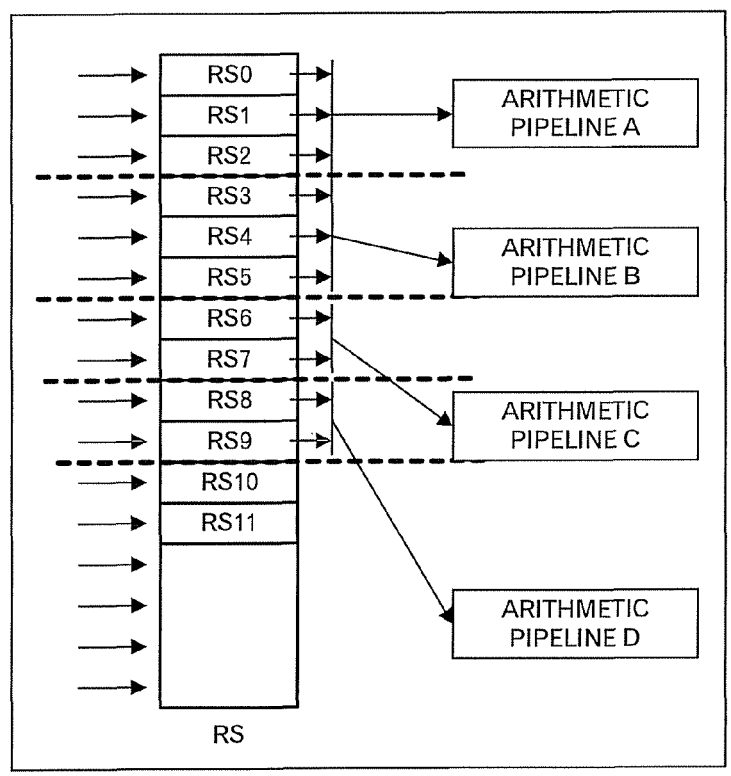

FIGS. 9A and 9B show an outline diagram of a third embodiment of this invention. In this embodiment, a case that only one reservation station is provided, different from the first and second embodiments, is handled, that is, an intensive type reservation station is handled. In an example of FIG. 9A, the reservation station includes 16 entries RS0 to RS15. Then, in a normal mode that instructions are stored in almost all entries of the reservation station, the entries RS0 to RS3 are associated with an arithmetic pipeline A, the entries RS4 to RS7 are associated with an arithmetic pipeline B, the entries RS8 to RS11 are associated with an arithmetic pipeline C, the entries RS12 to RS15 are associated with an arithmetic pipeline D, and logical groups whose number is the same as the number of arithmetic pipelines are defined. In the reservation station, the priority is set to each entry, and in FIGS. 9A and 9B, it is assumed that the entry having the highest priority is the entry RS0, and the greater the entry number is, the lower the priority is. In the group, the instruction stored in the entry having the highest priority among the issuable instructions is dispatched to the arithmetic pipeline. In addition, when the vacancy occurs in the upper-level entry, an instruction in the lower-level entry is moved to the upper-level entry.

However, for example, when the multi-thread method is adopted, the instruction dependency or the like is different in each thread, and the number of instructions, which are dispatchable to the arithmetic pipeline from each group of the entries in the reservation station is also different. In addition, the number of instructions outputted from the decoder to the reservation station is different according to the time. Therefore, the instructions are not always stored in all of the entries of the reservation station as shown in FIG. 9A, and when there are a lot of instructions, for which the dependency cannot be resolved, a lot of bubbles occurs in the arithmetic pipeline A. Then, by dynamically changing the group configuration of the entries based on the number of instructions in the reservation station, the frequency that the instruction is dispatched from the reservation station, or the like, the effective utilization of the arithmetic pipeline is realized. As specifically shown in FIG. 9B, the first group is composed of the entries RS0 to RS2 and is associated with the arithmetic pipeline A, and the second group is composed of the entries RS3 to RS5 and is associated with the arithmetic pipeline B, and the third group is composed of the entries RS6 and RS7 and is associated with the arithmetic pipeline C, and the fourth group is composed of the entries RS8 and RS9 and is associated with the arithmetic pipeline D. The entries RS10 to RS15 are not associated with any arithmetic pipelines, and their operations are stopped. However, there is no problem in a state that a few dispatchable instructions exist or the like, and because older instructions are moved to the upper-level entry, and they are preferentially dispatched to the arithmetic pipelines, the speedily execution of the instructions is realized.

Figure 10:
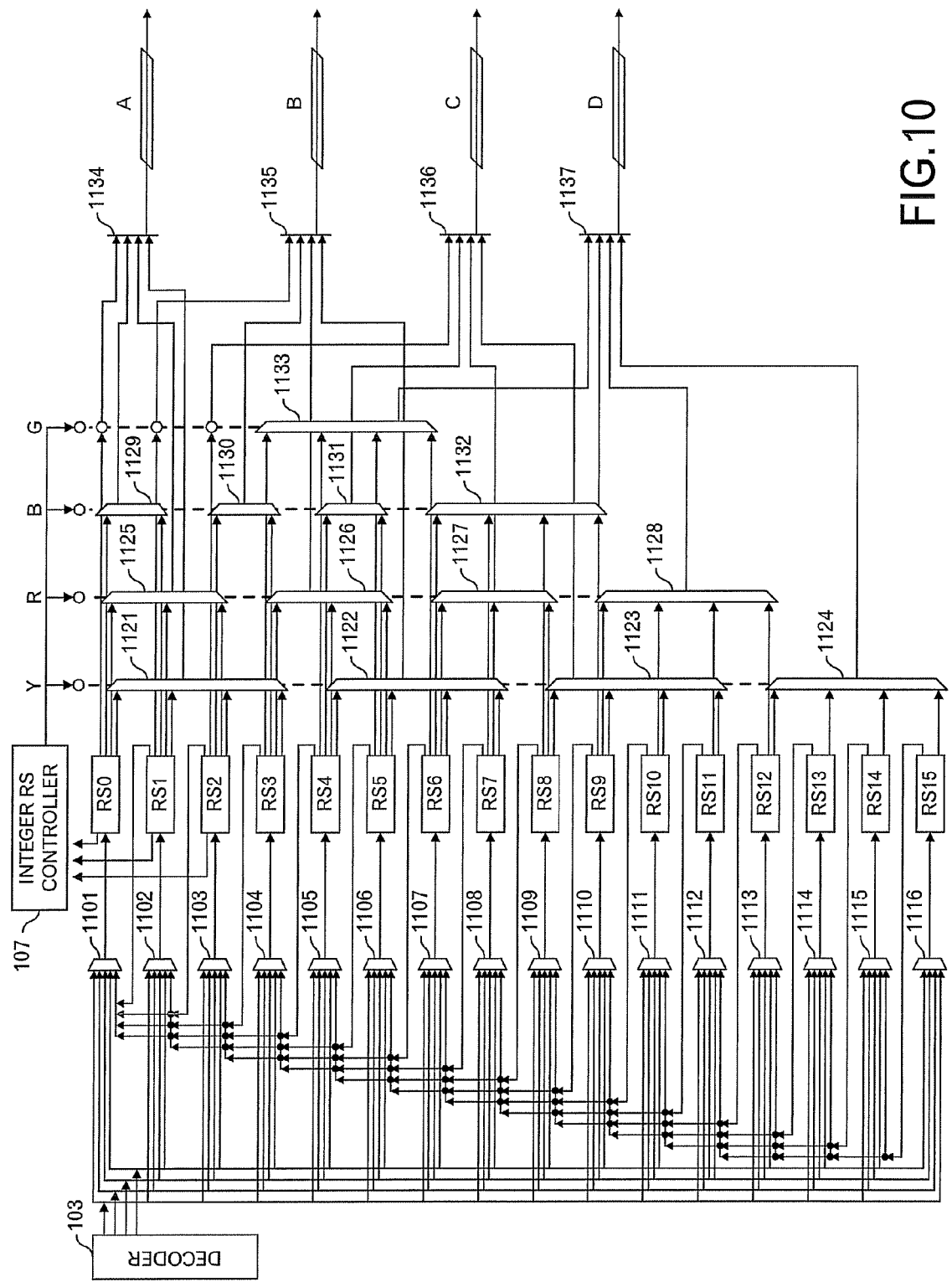
FIG. 10 is a diagram showing a circuit example in the third embodiment.

FIG. 10 shows a circuit example when the concept according to this embodiment shown in FIGS. 9A and 9B is implemented. Incidentally, although an example that plural RS 106 for the integer arithmetic and plural RS 109 for the floating point arithmetic are provided is shown in the functional block diagram of FIGS. 1A and 1B, as described above, one RS 106 for the integer arithmetic and one RS 109 for the floating point arithmetic are provide. In the following, although an example for the RS 106 for the integer arithmetic will be explained, the same can be applied to the RS 109 for the floating point arithmetic.

In this embodiment, the RS 106 for the integer arithmetic includes 16 entries RS0 to RS15, selectors 1101 to 1137 and the like. Each entry can judge whether or not stored instructions can be dispatched. The decoder 103 has four outputs, and they are connected to all inputs of the selectors 1101 to 1116. In addition, when the upper-level entry becomes vacant, an instruction is moved from the lower-level entry. In this embodiment, it is assumed that an instruction can be moved up to the four-upper-level entry. Therefore, an instruction stored in the entry RS15 can be moved to the entry RS11, RS12, RS13 or R14. Therefore, the entry RS15 is connected to an input of the selector 1115 connected to the entry RS14, an input of the selector 1114 connected to the entry RS13, an input of the selector 1113 connected to the entry RS12, and an input of the selector 1112 connected to the entry RS11. Similarly, in order to enable an instruction stored in the entry RS14 to be moved to the entry RS13, RS12, RS11 or RS10, the entry RS14 is connected to an input of the selector 1114 connected to the entry RS13, an input of the selector 1113 connected to the entry RS12, an input of the selector 1112 connected to the entry RS11 and an input of the selector 1111 connected to the entry RS10. In addition, in order to enable an instruction stored in the entry RS13 to be moved to the entry RS12, RS11, RS10 or RS9, the entry RS13 is connected to an input of the selector 1113 connected to the entry RS12, an input of the selector 1112 connected to the entry RS11, an input of the selector 1111 connected to the entry RS10 and an input of the selector 1110 connected to the entry RS9. In order to enable an instruction stored in the entry RS12 to be moved to the entry RS11, RS10, RS9 or RS8, the entry RS12 is connected to an input of the selector 1112 connected to the entry RS11, an input of the selector 1111 connected to the entry RS10, an input of the selector 1110 connected to the entry RS9 and an input of the selector 1109 connected to the entry RS8. In order to enable an instruction stored in the entry RS11 to be moved to the entry RS10, RS9, RS8 or RS7, the entry RS11 is connected to an input of the selector 1111 connected to the entry RS10, an input of the selector 1110 connected to the entry RS9, an input of the selector 1109 connected to the entry RS8 and an input of the selector 1108 connected to the entry RS7. In order to enable an instruction stored in the entry RS10 to be moved to the entry RS9, RS8, RS7 or RS6, the entry RS10 is connected to an input of the selector 1110 connected to the entry RS9, an input of the selector 1109 connected to the entry RS8, an input of the selector 1108 connected to the entry RS7 and an input of the selector 1107 connected to the entry RS6. In order to enable an instruction stored in the entry RS9 to be moved to the entry RS8, RS7, RS6 or RS5, the entry RS9 is connected to an input of the selector 1109 connected to the entry RS8, an input of the selector 1108 connected to the entry RS7, an input of the selector 1107 connected to the entry RS6 and an input of the selector 1106 connected to the entry RS5. In order to enable an instruction stored in the entry RS8 to be moved to the entry RS7, RS6, RS5 or RS4, the entry RS8 is connected to an input of the selector 1108 connected to the entry RS7, an input of the selector 1107 connected to the entry RS6, an input of the selector 1106 connected to the entry RS5 and an input of the selector 1105 connected to the entry RS4. In order to enable an instruction stored in the entry RS7 to be moved to the entry RS6, RS5, RS4 or RS3, the entry RS7 is connected to an input of the selector 1107 connected to the entry RS6, an input of the selector 1106 connected to the entry RS5, an input of the selector 1105 connected to the entry RS4 and an input of the selector 1104 connected to the entry RS3. In order to enable an instruction stored in the entry RS6 to be moved to the entry RS5, RS4, RS3 or RS2, the entry RS6 is connected to an input of the selector 1106 connected to the entry RS5, an input of the selector 1105 connected to the entry RS4, an input of the selector 1104 connected to the entry RS3 and an input of the selector 1103 connected to the entry RS2. In order to enable an instruction stored in the entry RS5 to be moved to the entry RS4, RS3, RS2 or RS1, the entry RS5 is connected to an input of the selector 1105 connected to the entry RS4, an input of the selector 1104 connected to the entry RS3, an input of the selector 1103 connected to the entry RS2 and an input of the selector 1102 connected to the entry RS1. In order to enable an instruction stored in the entry RS4 to be moved to the entry RS3, RS2, RS1 or RS0, the entry RS4 is connected to an input of the selector 1104 connected to the entry RS3, an input of the selector 1103 connected to the entry RS2, an input of the selector 1102 connected to the entry RS1 and an input of the selector 1101 connected to the entry RS0. In order to enable an instruction stored in the entry RS3 to be moved to the entry RS2, RS1, or RS0, the entry RS3 is connected to an input of the selector 1103 connected to the entry RS2, an input of the selector 1102 connected to the entry RS1 and an input of the selector 1101 connected to the entry RS0. In order to enable an instruction stored in the entry RS2 to be moved to the entry RS1, or RS0, the entry RS2 is connected to an input of the selector 1102 connected to the entry RS1 and an input of the selector 1101 connected to the entry RS0. In order to enable an instruction stored in the entry RS1 to be moved to the entry RS0, the entry RS1 is connected to an input of the selector 1101 connected to the entry RS0.

When the entry RS0 becomes vacant, the selector 1101 selects an output from an entry holding an instruction and having the highest priority among the entries RS1 to RS4, or when any entries RS1 to RS4 do not hold any instructions, the selector 1101 selects an output having the highest priority among four outputs from the decoder 103, and stores an instruction relating to the selected output into the entry RS0. A state judgment unit in the entry RS0, not the selector 1101 itself, may select an instruction output source, and the selector 1101 may operate in response to the selection. In the following, the same operation may be carried out. When the entry RS1 becomes vacant, the selector 1102 selects an output from an entry holding an instruction and having the highest priority among the entries RS2 to RS5, or when any entries RS2 to RS5 do not hold any instructions, the selector 1102 selects an output having the highest priority among four outputs from the decoder 103, (excluding the already selected output. The same is applied in the following.) and stores an instruction relating to the selected output into the entry RS1. When the entry RS2 becomes vacant, the selector 1103 selects an output from an entry holding an instruction and having the highest priority among the entries RS3 to RS6, or when any entries RS3 to RS5 do not hold any instructions, the selector 1103 selects an output having the highest priority among four outputs from the decoder 103, and stores an instruction relating to the selected output into the entry RS2. When the entry RS3 becomes vacant, the selector 1104 selects an output from an entry holding an instruction and having the highest priority among the entries RS4 to RS7, or when any entries RS4 to RS7 do not hold any instructions, the selector 1104 selects an output having the highest priority among four outputs from the decoder 103, and stores an instruction relating to the selected output into the entry RS3. When the entry RS4 becomes vacant, the selector 1105 selects an output from an entry holding an instruction and having the highest priority among the entries RS5 to RS8, or when any entries RS5 to RS8 do not hold any instructions, the selector 1105 selects an output having the highest priority among four outputs from the decoder 103, and stores an instruction relating to the selected output into the entry RS4. When the entry RS5 becomes vacant, the selector 1106 selects an output from an entry holding an instruction and having the highest priority among the entries RS6 to RS9, or when any entries RS6 to RS9 do not hold any instructions, the selector 1106 selects an output having the highest priority among four outputs from the decoder 103, and stores an instruction relating to the selected output into the entry RS5. When the entry RS6 becomes vacant, the selector 1107 selects an output from an entry holding an instruction and having the highest priority among the entries RS7 to RS10, or when any entries RS7 to RS10 do not hold any instructions, the selector 1107 selects an output having the highest priority among four outputs from the decoder 103, and stores an instruction relating to the selected output into the entry RS6. When the entry RS7 becomes vacant, the selector 1108 selects an output from an entry holding an instruction and having the highest priority among the entries RS8 to RS11, or when any entries RS8 to RS11 do not hold any instructions, the selector 1108 selects an output having the highest priority among four outputs from the decoder 103, and stores an instruction relating to the selected output into the entry RS7.

When the entry RS8 becomes vacant, the selector 1109 selects an output from an entry holding an instruction and having the highest priority among the entries RS9 to RS12, or when any entries RS9 to RS12 do not hold any instructions, the selector 1109 selects an output having the highest priority among four outputs from the decoder 103, and stores an instruction relating to the selected output into the entry RS8. When the entry RS9 becomes vacant, the selector 1110 selects an output from an entry holding an instruction and having the highest priority among the entries RS10 to RS13, or when any entries RS10 to RS13 do not hold any instructions, the selector 1110 selects an output having the highest priority among four outputs from the decoder 103, and stores an instruction relating to the selected output into the entry RS9. When the entry RS10 becomes vacant, the selector 1111 selects an output from an entry holding an instruction and having the highest priority among the entries RS11 to RS14, or when any entries RS11 to RS14 do not hold any instructions, the selector 1111 selects an output having the highest priority among four outputs from the decoder 103, and stores an instruction relating to the selected output into the entry RS10. When the entry RS11 becomes vacant, the selector 1112 selects an output from an entry holding an instruction and having the highest priority among the entries RS12 to RS15, or when any entries RS12 to RS15 do not hold any instructions, the selector 1112 selects an output having the highest priority among four outputs from the decoder 103, and stores an instruction relating to the selected output into the entry RS11. When the entry RS12 becomes vacant, the selector 1113 selects an output from an entry holding an instruction and having the highest priority among the entries RS13 to RS15, or when any entries RS13 to RS15 do not hold any instructions, the selector 1113 selects an output having the highest priority among four outputs from the decoder 103, and stores an instruction relating to the selected output into the entry RS12. When the entry RS13 becomes vacant, the selector 1114 selects an output from an entry holding an instruction and having the highest priority among the entries RS14 and RS15, or when any entries RS14 and RS15 do not hold any instructions, the selector 1114 selects an output having the highest priority among four outputs from the decoder 103, and stores an instruction relating to the selected output into the entry RS13. When the entry RS14 becomes vacant, the selector 1115 selects an output from the entry RS15, or when the entry RS15 does not hold any instructions, the selector 1115 selects an output having the highest priority among four outputs from the decoder 103, and stores an instruction relating to the selected output into the entry RS14. When the entry RS15 becomes vacant, the selector 1116 selects an output having the highest priority among four outputs from the decoder 103, and stores an instruction relating to the selected output into the entry RS15. When storing an instruction into an entry RSi, instructions of four outputs from the decoder 103 may be stored. When storing instructions from the decoder 103 into plural entries, instructions having higher priority are stored from the decoder 103 in an order from the entries 1101 to 1116. The instruction, whose storage to an entry having higher priority has already been determined, is prevented from storing into entries having lower priority.

The entries RS0 to RS2 are connected to the integer RS controller 107, and the integer RS controller 107 sets any one of "Y", "R", "B" and "G" to an operation mode according to the outputs from the entries RS0 to RS2. Then, when the operation mode is "Y", the integer RS controller 107 outputs an enable signal to the selectors 1121 to 1124. Furthermore, when the operation mode is "R", the integer RS controller 107 outputs an enable signal to the selectors 1125 to 1128. When the operation mode is "B", the integer RS controller 107 outputs an enable signal to the selectors 1129 to 1132. When the operation mode is "G", the integer RS controller 107 outputs an enable signal to the selectors 1133.

An input of the selector 1121 is connected to the entries RS0 to RS3, an input of the selector 1122 is connected to the entries RS4 to RS7, an input of the selector 1123 is connected to the entries RS8 to RS11, and an input of the selector 1124 is connected to the entries RS12 to RS15. The selector 1121 is connected to the selector 1134 and outputs an instruction in an entry having the highest priority among the entries holding dispatchable instructions through the selector 1134 to the arithmetic pipeline A. The selector 1122 is connected to the selector 1135 and outputs an instruction in an entry having the highest priority among the entries holding dispatchable instructions through the selector 1135 to the arithmetic pipeline B. Furthermore, the selector 1123 is connected to the selector 1136 and outputs an instruction in an entry having the highest priority among the entries holding dispatchable instructions through the selector 1136 to the arithmetic pipeline C. The selector 1124 is connected to the selector 1137 and outputs an instruction in an entry having the highest priority among the entries holding dispatchable instructions through the selector 1137 to the arithmetic pipeline D.

Thus, when the operation mode is "Y", a first group is composed of the entries RS0 to RS3, a second group is composed of the entries RS4 to RS7, a third group is composed of the entries RS8 to RS11, and a fourth group is composed of the entries RS12 to RS15.

In addition, an input of the selector 1125 is connected to the entries RS0 to RS2, an input of the selector 1126 is connected to the entries RS3 to RS5, an input of the selector 1127 is connected to the entries RS6 to RS8, and an input of the selector 1128 is connected to the entries RS9 to RS12. The selector 1125 is connected to the selector 1134 and outputs an instruction having the highest priority among the entries holding dispatchable instructions through the selector 1134 to the arithmetic pipeline A. The selector 1126 is connected to the selector 1135 and outputs an instruction having the highest priority among the entries holding dispatchable instructions through the selector 1135 to the arithmetic pipeline B. The selector 1127 is connected to the selector 1136 and outputs an instruction having the highest priority among the entries holding dispatchable instructions through the selector 1136 to the arithmetic pipeline C. The selector 1128 is connected to the selector 1137 and outputs an instruction having the highest priority among the entries holding dispatchable instructions through the selector 1137 to the arithmetic pipeline D.

Thus, when the operation mode is "R", a first group is composed of the entries RS0 to RS2, a second group is composed of the entries RS3 to RS5, a third group is composed of the entries RS6 to RS8, and a fourth group is composed of the entries RS9 to RS12.

Furthermore, an input of the selector 1129 is connected to the entries RS0 and RS1, an input of the selector 1130 is connected to the entries RS2 and RS3, an input of the selector 1131 is connected to the entries RS4 and RS5, and an input of the selector 1132 is connected to the entries RS6 to RS9. The selector 1129 is connected to the selector 1134 and outputs an instruction having the highest priority among the entries holding dispatchable instructions through the selector 1134 to the arithmetic pipeline A. The selector 1130 is connected to the selector 1135 and outputs an instruction having the highest priority among the entries holding dispatchable instructions through the selector 1135 to the arithmetic pipeline B. The selector 1131 is connected to the selector 1136 and outputs an instruction having the highest priority among the entries holding dispatchable instructions through the selector 1136 to the arithmetic pipeline C. The selector 1132 is connected to the selector 1137 and outputs an instruction having the highest priority among the entries holding dispatchable instructions through the selector 1137 to the arithmetic pipeline D.

Thus, when the operation mode is "B", a first group is composed of the entries RS0 and RS1, a second group is composed of the entries RS2 and RS3, a third group is composed of the entries RS4 and RS5, and a fourth group is composed of the entries RS6 and RS9.

In addition, the entry RS0 is directly connected to the selector 1134, the entry RS1 is directly connected to the selector 1135, the entry RS2 is directly connected to the selector 1136, and an input of the selector 1133e is connected to the entries RS3 to RS6. The selector 1133 is connected to the selector 1137, and outputs an instruction in the entry having the highest priority among the entries holding dispatchable instructions through the selector 1137 to the arithmetic pipeline D.

Thus, when the operation mode is "G", a first group is composed of the entry RS0, a second group is composed of the entry RS1, a third group is composed of the entry RS2, and a fourth group is composed of the entries RS3 to RS6.

Next, a detailed operation of the RS 106 for the integer arithmetic, the integer RS controller 107 and the like, which are shown in FIG. 10, will be explained by using FIGS. 11 and 12. First, the RS 106 for the integer arithmetic sets "G" to the operation mode as an initial value (step S61). Next, the RS 106 for the integer arithmetic enables a corresponding selector group according to the operation mode value (Y/R/B/G) (step S63). When the operation mode is "Y", the selectors 1121 to 1124 are enabled, when the operation mode is "R", the selectors 1125 to 1128 are enabled, when the operation mode is "B", the selectors 1129 to 1132 are enabled, and when the operation mode is "G", the selector 1133 is enabled.

Then, in each group of the reservation stations uniquely determined by the operation mode, output conditions (e.g. instruction dependency and vacancy of the arithmetic resources) are confirmed in an ascending order of the entry number (i.e. in a descending order of the priority), and an instruction in an entry, which firstly satisfied the output conditions, are caused to be outputted to a corresponding arithmetic pipeline (step S65). Simultaneously, the entries RS0, RS1 and RS2 outputs a signal (o) representing the dependency of the data has already been resolved or will be resolved by a bypass operation in the next cycle, a signal (X) representing that the dependency of the data is not resolved, or a signal (Δ) representing entries are vacant, to the integer RS controller 107 (step S67).

The integer RS controller receives a signal from the entries RS0 to RS2, and sets the operation mode value according to the resolution state of the dependency and the vacancy state of the entries (step S69). The operation mode value is set based on a table shown in FIG. 12. In FIG. 12, mode values are defined according to state combinations of RS0, RS1 and RS2. In the table, "-" means any values are applicable. In addition, the last three lines indicate other specific state combinations. Thus, the vacancy state of the entries, the instruction dispatch state from the entries to the arithmetic pipelines, or both of them are presumed by the states of the three entries, and an appropriate operation mode is identified according to the presumption. The processing returns to the step S63 after that. Incidentally, the instruction movement (also called "bubble-up") from the lower-level entry when the vacancy occurs in the upper-level entry and the instruction issuance from the decoder 103 are the same as the conventional ones. Therefore, the description is omitted in FIG. 11. However, for example, they are executed at the same timing as the step S69 or after the step S69.

As described above, by dynamically changing the entry group configuration according to the vacancy state of the entries and the instruction dispatch state from the entries to the arithmetic pipelines, older instructions are preferentially executed and the arithmetic pipelines are efficiently utilized.

Figure 11:
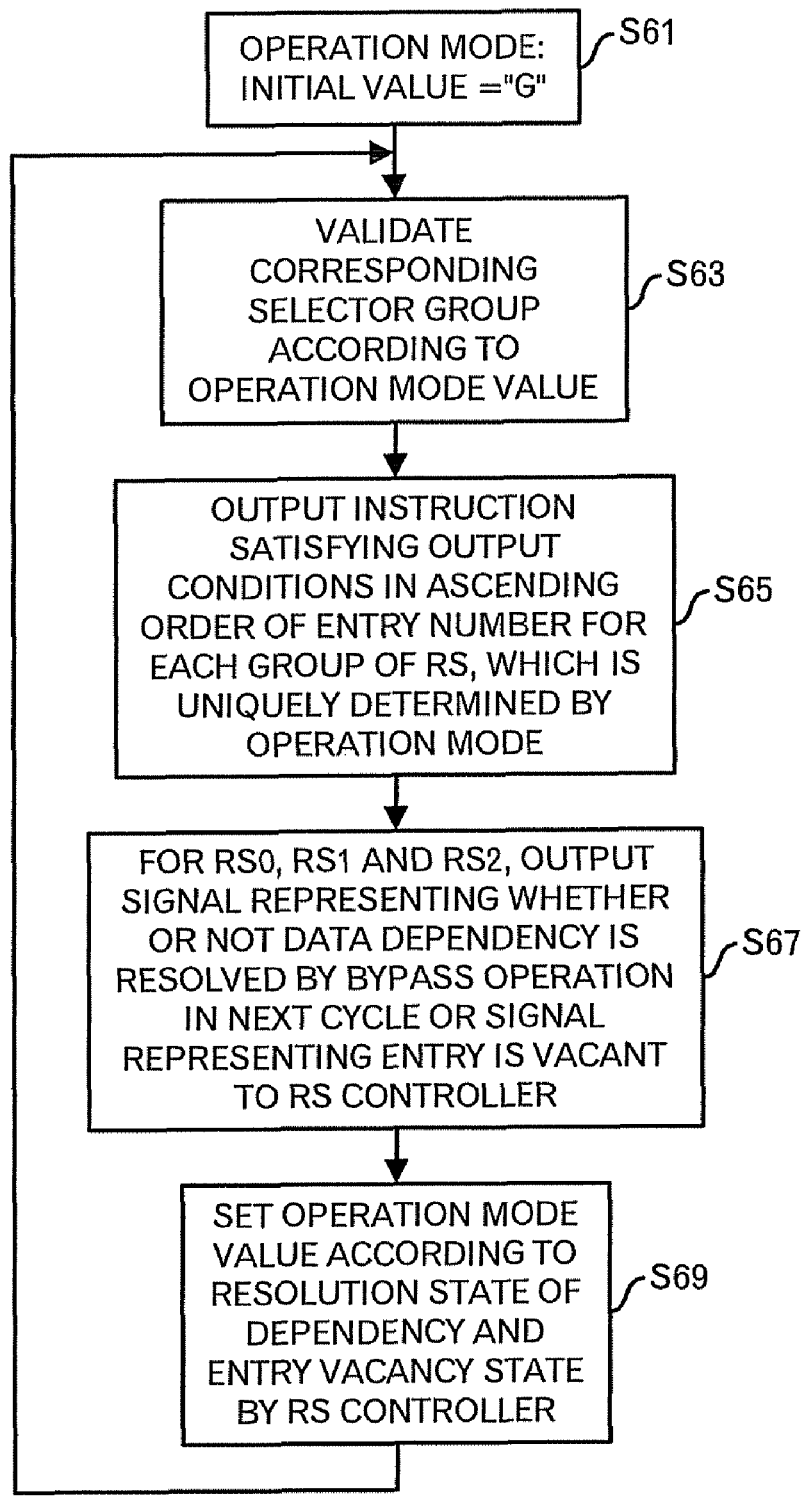
FIG. 11 is a diagram showing a processing flow in the third embodiment.
Figure 12:
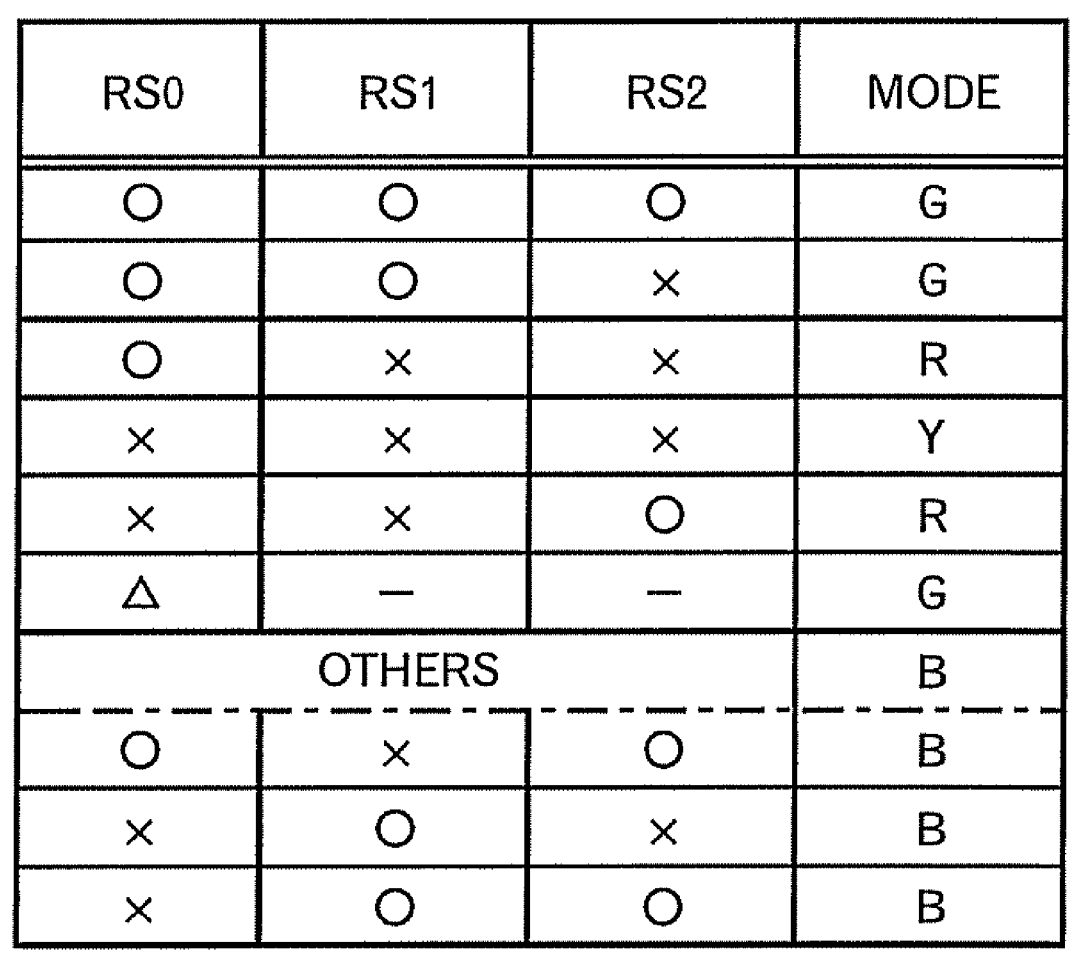

Incidentally, FIGS. 11 and 12 are mere examples, and the number of modes and the number of entries to which the RS controller refers may be changed. However, on certain occasions, the complexity may increase and the penalty may have to be paid. In addition, even when the number of modes, the number of entries to which the RS controller refers and the like are not changed, the content of the table shown in FIG. 12 may be changed according to the tuning.

Furthermore, although an example that the step S65 is simultaneously executed at the step S67 was shown, the step S67 may be executed for the instructions stored in the entries RS0 to RS2 after the step S65 is executed and the bubble-up is carried out without simultaneously executing the steps S65 and S67. Furthermore, at the step S67, even when the instruction dependency is resolved on a basis of the registers, a signal (o) representing the data dependency is resolved may be outputted to the RS controller.

Embodiment 4

Figure 13A:
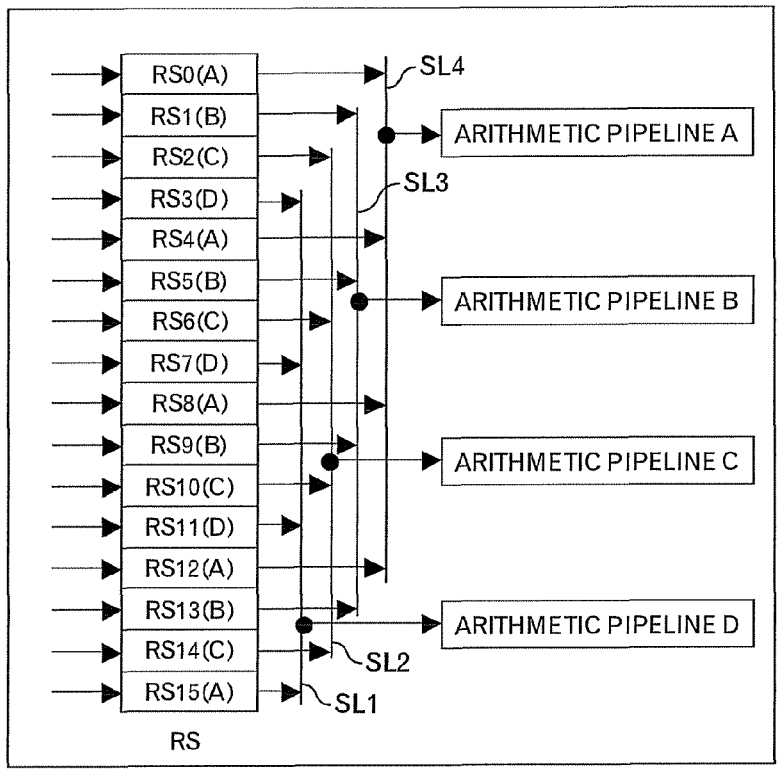
FIGS. 13A and 13B are outline diagrams in a fourth embodiment of this invention.
Figure 13B:
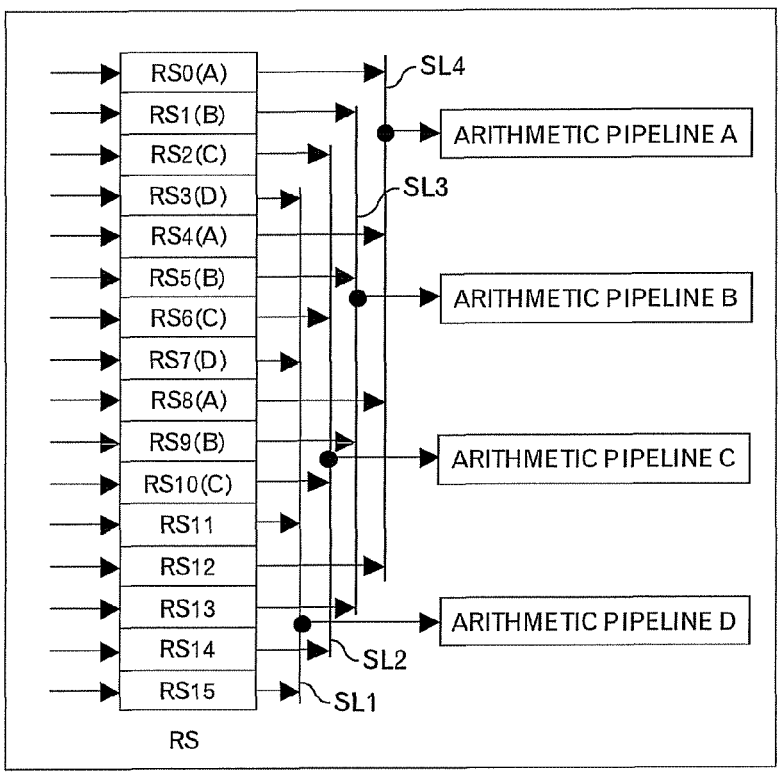

FIGS. 13A and 13B show an outline diagram relating to a fourth embodiment of this invention. This embodiment relates to a mechanism for showing and using physically one reservation station as logically plural reservation stations.

In FIGS. 13A and 13B, one reservation station is composed of 16 entries RS0 to RS15, and the entries RS0, RS4, RS8 and RS12, which belong to a first group, are connected to an arithmetic pipeline A through a selector SL4, the entries RS1, RS5, RS9 and RS13, which belong to a second group, are connected to an arithmetic pipeline B through a selector SL3, the entries RS2, RS5, RS10 and RS14, which belong to a third group, are connected to an arithmetic pipeline C through a selector SL2, and the entries RS3, RS7, RS11 and RS15, which belong to a fourth group, are connected to an arithmetic pipeline D through a selector SL1. Incidentally, it is assumed that the entry RS0 has the highest priority, and the entry RS15 has the lowest priority. Then, each selector operates so as to output an instruction held in an entry having the highest priority among the entries holding dispatchable instructions to the arithmetic pipeline. In addition, when an instruction is dispatched from the upper-level entry, an instruction is moved from the lower-level entry to the vacant upper-level entry.

By adopting such a configuration, when instructions are not stored in all of the entries, that is, even when any instruction is not stored in the entries RS11 to RS15 as shown in FIG. 13B, because at least one entry is connected to each arithmetic pipeline through the selectors, it is possible to suppress bubbles in the arithmetic pipelines to the minimum level.

Figure 14:
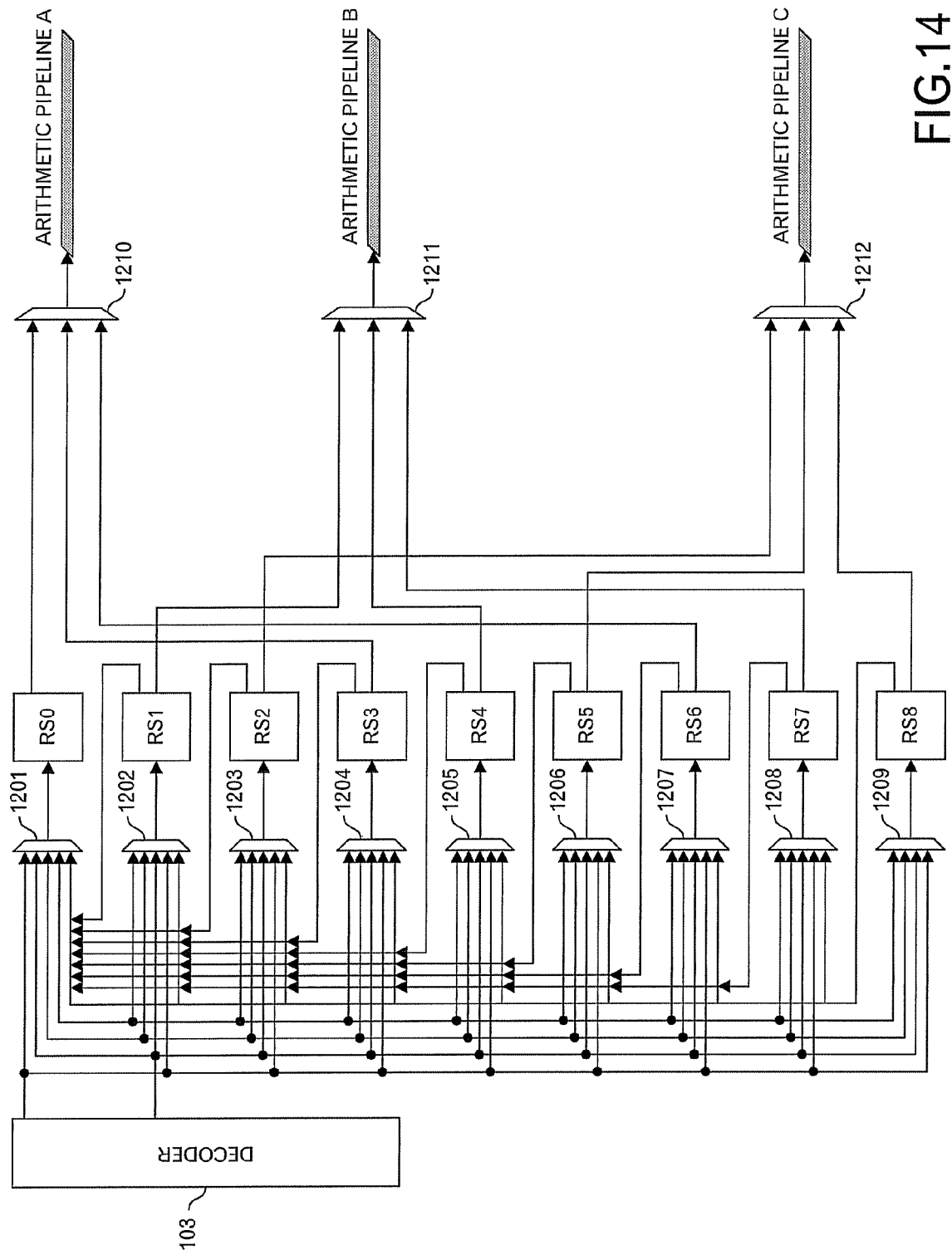
FIG. 14 is a diagram showing a circuit example in the fourth embodiment.

FIG. 14 shows a detailed circuit example relating to this embodiment. FIG. 14 shows an example using a reservation station having 9 entries. The reservation station in this embodiment includes entries RS0 to RS8, selectors 1201 to 1212 and the like. Two outputs of the decoder 103 are respectively connected to the selectors 1201 to 1209. In addition, in this embodiment, an instruction can be moved from all of the lower-level entries to the upper-level entries. That is, an input of the selector 1209 connected to the entry RS8 is connected to only an output of the decoder 103, and an output of the selector 1208 connected to the entry RS7 is connected to the entry RS8 and the output of the decoder 103. An output of the selector 1207 connected to the entry RS6 is connected to the entries RS7 and RS8 and the output of the decoder 103. An output of the selector 1206 connected to the entry RS5 is connected to the entries RS6 to RS8 and the output of the decoder 103. An output of the selector 1205 connected to the entry RS4 is connected to the entries RS5 to RS8 and the output of the decoder 103. An output of the selector 1204 connected to the entry RS3 is connected to the entries RS4 to RS8 and the output of the decoder 103. An output of the selector 1203 connected to the entry RS2 is connected to the entries RS3 to RS8 and the output of the decoder 103. An output of the selector 1202 connected to the entry RS1 is connected to the entries RS2 to RS8 and the output of the decoder 103. An output of the selector 1201 connected to the entry RS0 is connected to the entries RS1 to RS8 and the output of the decoder 103.

The selector 1201 outputs to the entry RS0, an instruction of an entry, which is not vacant and has the highest priority, among the entries RS1 to RS8, or an instruction issued by the decoder 103 when there is no instruction in the entries RS1 to RS8. A state judgment unit or the like in the entry RS0, not the selector 1201 itself, may select the instruction output source, and according to the selection, the selector 1201 may operate. The same matter can be applied to the following selectors. Similarly, the selector 1202 outputs to the entry RS1, an instruction of an entry, which is not vacant and has the highest priority, among the entries RS2 to RS8, or an instruction issued by the decoder 103 when there is no instruction in the entries RS2 to RS8. The selector 1203 outputs to the entry RS2, an instruction of an entry, which is not vacant and has the highest priority, among the entries RS3 to RS8, or an instruction issued by the decoder 103 when there is no instruction in the entries RS3 to RS8. The selector 1204 outputs to the entry RS3, an instruction of an entry, which is not vacant and has the highest priority, among the entries RS4 to RS8, or an instruction issued by the decoder 103 when there is no instruction in the entries RS4 to RS8. The selector 1205 outputs to the entry RS4, an instruction of an entry, which is not vacant and has the highest priority, among the entries RS5 to RS8, or an instruction issued by the decoder 103 when there is no instruction in the entries RS5 to RS8. The selector 1206 outputs to the entry RS5, an instruction of an entry, which is not vacant and has the highest priority, among the entries RS6 to RS8, or an instruction issued by the decoder 103 when there is no instruction in the entries RS6 to RS8. The selector 1207 outputs to the entry RS6, an instruction of an entry, which is not vacant and has the highest priority, among the entries RS7 and RS8, or an instruction issued by the decoder 103 when there is no instruction in the entries RS7 and RS8. The selector 1208 outputs to the entry RS7, an instruction of the entry RS8, or an instruction issued by the decoder 103 when there is no instruction in the entries RS3 to RS8.

The entries RS0, RS3 and RS6 are connected to an input of the selector 1210, the entries RS1, RS4 and RS7 are connected to an input of the selector 1211 and the entries RS2, RS5 and RS8 are connected to an input of the selector 1212. The selector 1210 outputs to an arithmetic pipeline A, an instruction held in an entry having a dispatchable instruction and the highest priority. The selector 1211 outputs to an arithmetic pipeline B, an instruction held in an entry having a dispatchable instruction and the highest priority. Furthermore, the selector 1212 outputs to an arithmetic pipeline C, an instruction held in an entry having a dispatchable instruction and the highest priority.

In this embodiment, because plural entries are allocated to each arithmetic pipeline dispersively from the upper-level to the lower-level even without switching modes based on the number of instructions, dispatch frequency of the instructions or the like, the effective utilization of the arithmetic pipelines is realized.

Figure 15A:
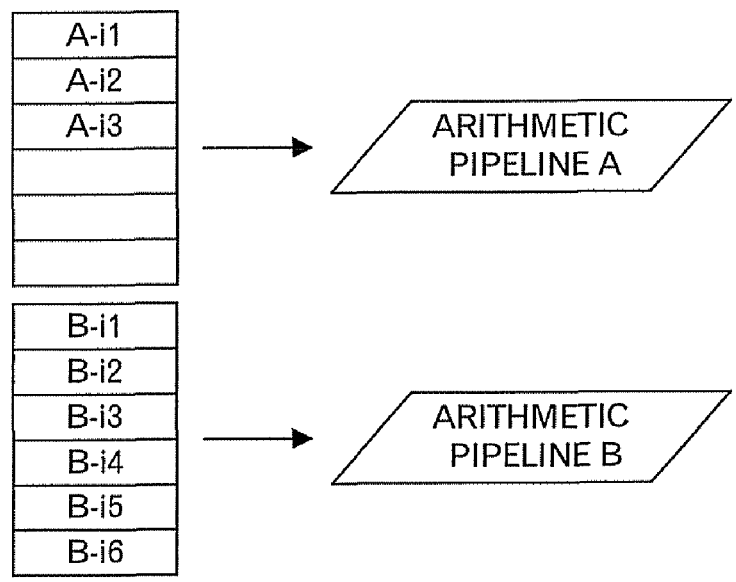
FIGS. 15A and 15B are diagrams to explain throughput in a convention technique.
Figure 15B:
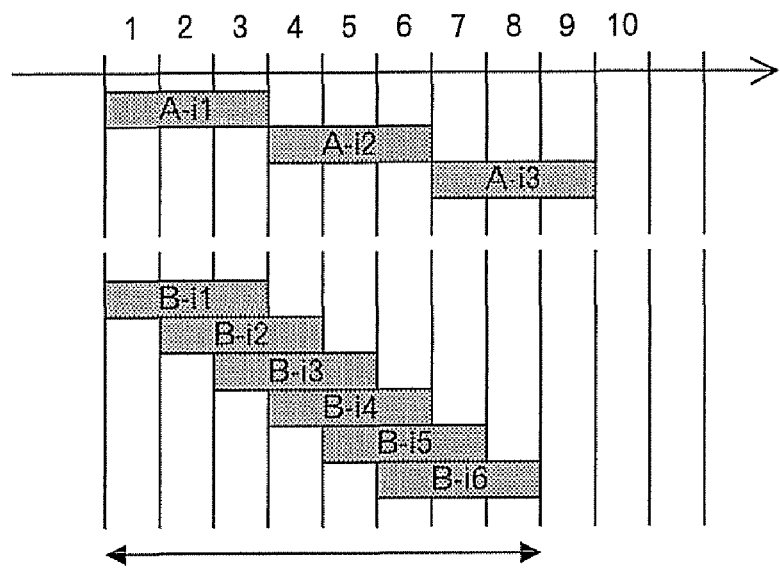

More specifically, an operation and effect of this embodiment will be considered. For example, as shown in FIG. 15A, it is assumed that threads A and B exist, instructions of the thread A are outputted from one reservation station to a corresponding arithmetic pipeline, and instructions of the thread B are outputted from another reservation station to a corresponding arithmetic pipeline. At that time, it is assumed that each instruction in the thread A has the dependency, and the next instruction cannot be executed if the execution of one instruction has not been completed, and the thread B does not have such a limitation. In a case of the conventional reservation station configuration as shown in FIG. 15A, an instruction B-i6 of the thread B can be completed up to the end of the 8-th cycle as depicted in FIG. 15B.

Figure 16A:
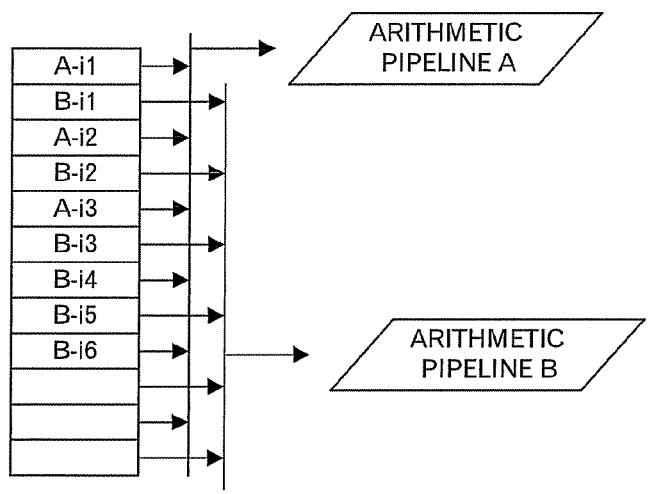
FIGS. 16A to 16C are diagrams to explain the throughput in the fourth embodiment.
Figure 16B:
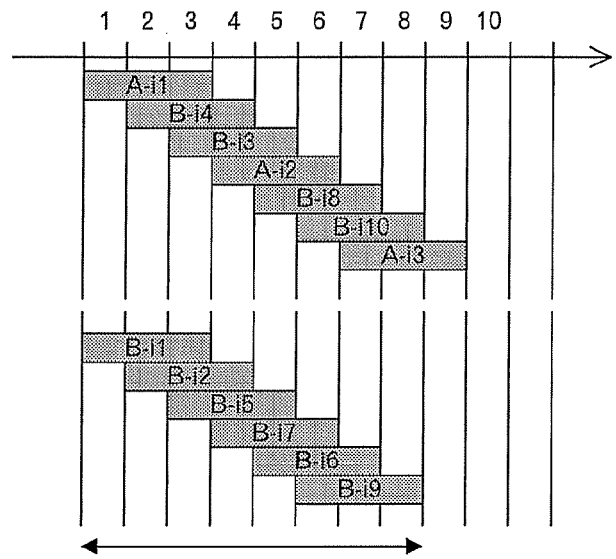
Figure 16C:
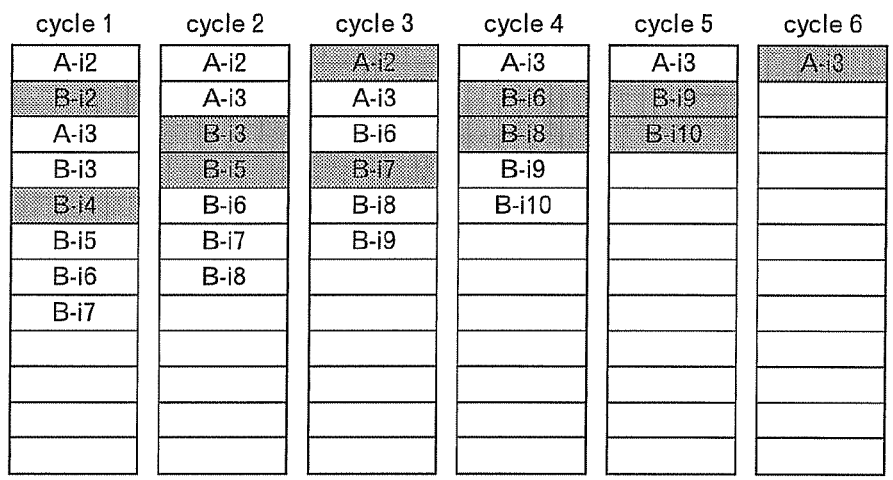

On the other hand, when a configuration according to this embodiment as shown in FIG. 16A is adopted, one reservation station is used, and instructions can be outputted to two arithmetic pipelines for each entry group, an instruction B-i10 can be executed at the end of the 8-th cycle as shown in FIG. 16B. Incidentally, as shown in FIG. 16A, when instructions A-i1 to A-i3 of the thread A and instructions B-i1 to B-i3 of the thread B are initially stored one after the other in the reservation station, and instructions B-i4 to B-i6 are stored in sequence, the instruction A-i1 of the thread A is outputted to the arithmetic pipeline A and the instruction B-i1 of the thread B is outputted to the arithmetic pipeline B at the beginning of the first cycle. Therefore, as shown in FIG. 16C, instructions A-i2 and A-i3 and instructions B-i2 to B-i7 are held in the reservation station in the first cycle by the bubble-up and the instruction issuance. Incidentally, the instruction B-i7 is a newly issued instruction by the decoder.

Then, at the beginning of the second cycle, because the instructions A-i2 and A-i3 cannot be outputted to the arithmetic pipeline A, the instruction B-i4 is outputted to the arithmetic pipeline A, and the instruction B-i2 is outputted to the arithmetic pipeline B. Therefore, in the second cycle, by the bubble-up and the instruction issuance from the decoder, the instructions A-i2 and A-i3 and the instructions B-i5 to B-i8 are held in the reservation station. Incidentally, the instruction B-i8 is an instruction newly issued by the decoder. After that, at the beginning of the third cycle, because the instruction A-i2 cannot be outputted to the arithmetic pipeline A, the instruction B-i3 is outputted to the arithmetic pipeline A, and because the instruction A-i3 cannot be outputted to the arithmetic pipeline B, the instruction B-i5 is outputted to the arithmetic pipeline B. Therefore, in the third cycle, by the bubble-up and the instruction issuance from the decoder, the instructions A-i2 and A-i3 and the instructions B-i6 to B-i9 are held in the reservation station. Incidentally, the instruction B-i9 is an instruction newly issued by the decoder.

Further after that, at the beginning of the fourth cycle, because the instruction A-i2 can be outputted to the arithmetic pipeline A, this instruction A-i2 is outputted, and because the instruction A-i3 cannot be outputted to the arithmetic pipeline B, the instruction B-i7 is outputted to the arithmetic pipeline B. Therefore, in the fourth cycle, by the bubble-up and the instruction issuance, the instructions A-i3, B-i6, and B-i8 to B-i10 are held in the reservation station. Incidentally, the instruction B-i10 is an instruction newly issued by the decoder. Further after that, at the beginning of the fifth cycle, because the instruction A-i3 cannot be outputted to the arithmetic pipeline A, the instruction B-i8 is outputted to the arithmetic pipeline A, and the instruction B-i6 is outputted to the arithmetic pipeline B. Therefore, in the fifth cycle, by the bubble-up, the instructions A-i3, B-i9 and B-i10 are held in the reservation station. Further after that, at the beginning of the sixth cycle, because the instruction A-i3 cannot be outputted to the arithmetic pipeline A, the instruction B-i10 is outputted, and the instruction B-i9 is outputted to the arithmetic pipeline B. Therefore, in the sixth cycle, by the bubble-up, only the instruction A-i3 is held in the reservation station. Then, in the seventh cycle, the instruction A-i3 is enabled to be outputted, then it is outputted to the arithmetic pipeline A. As described above, apparently, the throughput of this embodiment is improved more than the conventional method.

Although the embodiments of this invention were described above, this invention is not limited to these embodiments. For example, the configuration according to the first embodiment can be applied to one entry of the third embodiment, for example. Similarly, the configuration according to the first embodiment can be applied to an entry of the fourth embodiment, for example. Furthermore, because the size of the circuits shown in the figure is determined according to the convenience of the explanation, it is possible to arbitrarily set the number of circuits when applying to the actual processor device.

In addition, in the first and second embodiments, when a set is composed of two reservation stations, and a state that the dispatch cannot be carried out to the arithmetic pipeline occurs in one reservation station, the other reservation station carries out the dispatch or the instruction movement. However, the set is composed of three or more reservation stations.

The invention claimed is:

1. A processor device, comprising:
   a plurality of reservation stations, each having a plurality of entries;
   a plurality of arithmetic pipelines; and
   a controller for said plurality of reservation stations, and
   wherein, in a normal mode, a first reservation station of said plurality of reservation stations is associated with a first arithmetic pipeline of said plurality of arithmetic pipelines,
   in said normal mode, a second reservation station other than said first reservation station of said plurality of reservation stations is associated with a second arithmetic pipeline other than said first arithmetic pipeline of said plurality of arithmetic pipelines,
   when said controller detects a specific operation mode that an instruction dispatch from said first reservation station to said first arithmetic pipeline is not carried out, said controller makes said second reservation station dispatch a first instruction, having a first highest priority among entries, that satisfies a predetermined output condition to said second arithmetic pipeline
   and dispatch a second instruction, having a second highest priority, that satisfies said predetermined output condition to said first arithmetic pipeline, and
   wherein said controller detects either of said normal mode and said specific operation mode by receiving a signal representing whether or not a dispatch was carried out, from said first and second reservation stations,
   in said specific operation mode, after an instruction is dispatched from said second reservation station to said first arithmetic pipeline, when a dispatchable instruction exists in any entries of said first reservation station and first reservation station dispatches no instruction to said first arithmetic pipeline, said first reservation station outputs a signal representing said dispatch was carried out to said controller, and said controller detects mode change from said specific operation mode to said normal mode;
   wherein each of the plurality of entries hold bits to judge whether or not to dispatch instructions to the arithmetic pipeline, wherein the bits of each entry are ANDed to determine whether the dispatch is carried out;
   if the result of the ANDing is "1", the dispatch is carried out,
   if the result of the ANDing is "0", the dispatch is not carried out from the judged entry; and
   if the output result of all AND circuits is "0" the controller receives a signal representing a change of mode from normal mode to specific operation mode.

2. The processor device as set forth in claim 1, wherein, when said controller detects a second specific mode that an instruction is not dispatched from said second reservation station to said second arithmetic pipeline, said controller makes said first reservation station dispatch a third instruction that satisfies said predetermined output condition to said first arithmetic pipeline and dispatch a fourth instruction that satisfies said predetermined output condition to said second arithmetic pipeline.

3. The processor device as set forth in claim 1, wherein said specific operation mode is a mode that an instruction dispatch from said first reservation station to said first arithmetic pipeline is not successively carried out plural times.

* * * * *